(12) United States Patent
Huang et al.

(10) Patent No.: US 11,085,891 B2
(45) Date of Patent: Aug. 10, 2021

(54) NUCLEAR MAGNETIC RESONANCE IMPLEMENTED SYNTHETIC INDOLE AND INDAZOLE CANNABINOID DETECTION, IDENTIFICATION, AND QUANTIFICATION

(71) Applicant: HOFSTRA UNIVERSITY, Hempstead, NY (US)

(72) Inventors: Ling Huang, Westbury, NY (US); Michael Anthony Marino, N. Bellmore, NY (US); Brandy Voyer, East Stroudsburg, PA (US)

(73) Assignee: Hofstra University, Hempstead, NY (US)

( * ) Notice: Subject to any disclaimer, the term of this patent is extended or adjusted under 35 U.S.C. 154(b) by 769 days.

(21) Appl. No.: 14/786,524

(22) PCT Filed: Apr. 25, 2014

(86) PCT No.: PCT/US2014/035522
§ 371 (c)(1),
(2) Date: Oct. 22, 2015

(87) PCT Pub. No.: WO2014/176542
PCT Pub. Date: Oct. 30, 2014

(65) Prior Publication Data
US 2016/0084779 A1  Mar. 24, 2016

Related U.S. Application Data

(60) Provisional application No. 61/816,325, filed on Apr. 26, 2013.

(51) Int. Cl.
G01N 24/08 (2006.01)

(52) U.S. Cl.
CPC .......... *G01N 24/084* (2013.01); *G01N 24/08* (2013.01)

(58) Field of Classification Search
CPC ..... G01N 33/948; G01N 24/084; G01N 24/08
See application file for complete search history.

(56) References Cited

U.S. PATENT DOCUMENTS

2012/0100546 A1  4/2012  Lowery, Jr. et al.
2013/0066053 A1  3/2013  Fitzberald et al.

OTHER PUBLICATIONS

Kim, H.K. et al. "NMR-based metabolomic analysis of plants," Nature Protocols vol. 5, pp. 536-549 (2010). (Year: 2010).*

(Continued)

*Primary Examiner* — Christopher Adam Hixson
*Assistant Examiner* — Michelle Adams
(74) *Attorney, Agent, or Firm* — Hoffmann & Baron, LLP

(57) ABSTRACT

The present invention provides a method for detecting synthetic indole and indazole cannabinoids in a sample known or suspected to contain a synthetic indole or indazole cannabinoid in the absence of chromatography. A deuterated solvent is added to the solid sample, creating a suspension. The synthetic cannabinoid is detected in the suspension by analysis of the sample NMR spectrum. When one-dimensional proton NMR is used, detection of a first peak between 8.00 and 8.50 ppm and a second peak between 4.00 and 4.40 ppm, indicates the presence of a synthetic indole or indazole cannabinoid. When two-dimensional Correlation Spectroscopy (COSY) NMR is used, detection of a first spot between 6.50 and 9.00 ppm and a second spot between 1.50 and 4.50 ppm indicates the presence of a synthetic indole or indazole cannabinoid.

13 Claims, 16 Drawing Sheets

(56) References Cited

OTHER PUBLICATIONS

Gottlieb, H.E. et al. "NMR Chemical Shifts of Common Laboratory Solvents as Trace Impurities," J. Org. Chem. 1997, 62, 21, 7512-7515. (Year: 1997).*

"Heterocyclyl groups." IUPAC. Compendium of Chemical Terminology, 2nd ed. (the "Gold Book"). Compiled by A. D. McNaught and A. Wilkinson. Blackwell Scientific Publications, Oxford (1997). (Year: 1997).*

"Heteroaryl groups." IUPAC. Compendium of Chemical Terminology, 2nd ed. (the "Gold Book"). Compiled by A. D. McNaught and A. Wilkinson. Blackwell Scientific Publications, Oxford (1997). (Year: 1997).*

Harris, R.K. "NMR nomenclature. Nuclear spin properties and conventions for chemical shifts (IUPAC Recommendations 2001)." Pure and Applied Chemistry, vol. 73, Issue 11, pp. 1795-1818. (Year: 2001).*

Ling Huang, Brandy Voyer, Michael Marino, Jordan Finzel, Mercurio Veltri, Nanette Wachter. "Identification and Quantification of Synthetic Cannabinoids in Herbal Products with NMR," Conference Paper, Feb. 2014 (Year: 2014).*

Marino, M.A. et al. "Rapid Screening and Quantification of Synthetic Cannabinoids in DART-MS and NMR Spectroscopy" (2016). Faculty Works: Biology, Chemistry, and Environmental Studies. 23. (Year: 2016).*

Assemat, G. et al. "Screening of 'spice' herbal mixtures: From high-field to low-field proton NMR," Forensic Science International 279 (2017) 88-95 (Year: 2017).*

Huang, L.; Marino, M.; Veltri, M.; Cody, R.B.; Dane, A.J. "Rapid Screening of Synthetic Cannabinoids with NMR and DART-MS," Conference Paper, Feb. 2013 (Year: 2013).*

Rivera, A.; Marino, M.; Huang, L.; Veltri, M.; Cody, R.B.; Kim, W.J. "Rapid Detection of Synthetic Cannabinoids in Consumer Products," Poster, Mar. 2012 (Year: 2012).*

Marino, M.A.; Huang, L.; Rivera, A.; Cody, R.B.; Kim, W.J. "Rapid detection of synthetic cannabinoids in consumer products through DART-MS, NMR and HPLC," poster abstract, Mar. 26, 2012. (Year: 2012).*

Znaleziona, J. et al. "Determination and identification of synthetic cannabinoids and their metabolites in different matrices by modern analytical techniques—a review," Analytica Chimica Acta 874 (2015) 11-25. Available online Jan. 3, 2015. (Year: 2015).*

Brents, L.K. "The K2/Spice Phenomenon: emergence, identification, legislation and metabolic characterization of synthetic cannabinoids in herbal incense products," Drug Metab Rev. Feb. 2014; 46(1): 72-85. Published online Sep. 24, 2013. (Year: 2013).*

Li, S.-H. et al. "Microchemical analysis of laser-microdissected stone cells of Norway spruce by cryogenic nuclear magnetic resonance spectroscopy," Planta vol. 225, pp. 771-779 (2007). (Year: 2007).*

Politi, M. et al. "Direct NMR analysis of cannabis water extracts and tinctures and semi-quantitative data on Δ9-THC and Δ9-THC-acid," Phytochemistry 69 (2008) 562-570 (Year: 2008).*

Huang, L."'Spice' Tales: Good Chemists vs. Evil," Hofstra Horizons, May 9, 2012. Downloaded from the Internet at <https://news.hofstra.edu/2012/05/09/spice-tales-good-chemists-vs-evil/> on Mar. 1, 2021. (Year: 2012).*

Denooz et al.; Identification and Structural Elucidation of Four Cannabimimetic Compounds (RCS-4, AM-2201, JWH-203 and JWH-210) in Seized Products; Journal of Analytical Toxicology (2013) 37:56-63.

Koskela et al.; Separation and structural characterization of a synthetic cannabinoid found in a herbal product using off-line LC-DAD-NMR; Analytical Methods (2011) 3, 2307-2312.

Extended European Search Report issued in corresponding European Application No. 14787963.9 dated Aug. 10, 2017.

Uchiyama et al.; Two new-type cannabimimetic quinolinyl carboxylates, QUPIC and QUCHIC, two new cannabimimetic carboxamide derivatives, ADB-FUBINACA and ADBICA, and five synthetic cannabinoids detected with a thiophene derivative α-PVT and an opioid receptor agonist AH-7921 identified in illegal products; Forensic Toxicol (2013) 31:223-240.

Moosmann et al.; Separation and structural characterization of the synthetic cannabionoids JWH-412 and 1-[(5-fluoropentyl)-1H-indol-3yl]-(4-methylnaphthalen-1-yl)methanone using GC-MS, NMR analysis and a flash chromatography system; Forensic Science International 220 (2012) e17-e22.

Lindigkeit et al.; Spice: A never ending story? Forensic Science International 191 (2009) 58-63.

Uchiyama et al.; Identification of a cannabimimetic indole as a designer drug in a herbal product; Forensic Toxicol (2009) 27:61-66.

International Search Report issued in corresponding Application PCT/US2014/035522.

* cited by examiner

NUCLEAR MAGNETIC RESONANCE IMPLEMENTED SYNTHETIC INDOLE AND INDAZOLE CANNABINOID DETECTION, IDENTIFICATION, AND QUANTIFICATION

CROSS-REFERENCE TO RELATED APPLICATIONS

This application is the U.S. National Phase of International Patent Application No. PCT/US2014/035522 filed Apr. 25, 2014, which claims priority based on U.S. Provisional Application No. 61/816,325, filed Apr. 26, 2013, all of which are incorporated herein by reference.

BACKGROUND OF THE INVENTION

Throughout the country there has been a surge in the use of synthetic cannabinoids, which can produce similar psychological and physiological effects as the illegal drug marijuana. Synthetic cannabinoids are popular because in many areas they can be purchased and smoked or otherwise used legally or because users believe the synthetic drug will bypass drug testing protocols. Moreover, because manufacturers are capable of easily synthesizing these chemicals to avoid detection, regulatory and law enforcement control has been made more difficult.

Current analytical testing methods are not capable of practical, rapid and accurate detection and/or quantification of synthetic cannabinoids in botanical products or solids. For example, spectroscopic and chromatographic separation methods involve a lengthy extraction process and multiple steps in order to prepare a sufficient sample for analysis, including: separation, isolation, purification, rinsing, evaporation, and crystallization. These multiple steps make analysis time consuming and impractical for purposes of law enforcement.

Furthermore, currently used identification techniques, such as mass spectrometry (MS) are not without limitation. For example, MS may not be able to discriminate between two isomers because MS analysis of two isomers may generate the same fragmentation pattern.

Lindigkeit et al. (Forensic Sci Int 2009, 191(1-3): 58-63) teaches a method of isolating an indole cannabinoid from commercially available herbal mixtures. However, Lindigkeit's method begins with a Soxhlet extraction starting with petroleum ether and followed by methanol. This step can take up to 3 hours. The resulting product is then concentrated and the indole cannabinoid derivative is isolated by silica-gel column chromatography. The fractions containing the indole cannabinoid are then collected and concentrated. The components of the gel chromatography are separated on a thin layer chromatography plate (TLC), and are re-dissolved in a suitable solvent. The TLC step can take up to 45 minutes. The resulting product is then subject to Nuclear Magnetic Resonance (NMR) for analysis.

Uchiyama et al. (Forensic Toxicol 2009, 27:61-66) teach a similarly complex process of isolating synthetic indole cannabinoids. In Uchiyama, the commercially available herbal mixture suspected of containing a synthetic indole cannabinoid is crushed and extracted under ultrasonication. Uchiyama reports three one-hour extractions. The combined supernatant was evaporated to dryness. The extract was loaded on a TLC plate. The TLC step can take up to 45 minutes. The portion of the TLC plate suspected of containing the synthetic indole cannabinoid is isolated and extracted with an organic solvent. This extraction is repeated. The resulting product is then subject to NMR for analysis. This method can take up to 4 hours.

Accordingly, there is a need to provide for methods that are capable of accurate and rapid detection, identification, and quantification of synthetic cannabinoids.

SUMMARY OF THE INVENTION

The present invention provides a method for detecting synthetic indole and indazole cannabinoids in a sample known or suspected to contain a synthetic indole or indazole cannabinoid. A deuterated solvent is added to the solid sample, creating a suspension. The suspension is mixed to release the cannabinoid from the solid sample. The suspension is subject to a NMR spectroscopy process to produce a sample NMR spectrum. The synthetic cannabinoid is detected in the suspension by analysis of the sample NMR spectrum. When one-dimensional proton NMR is used, detection of a first peak between 8.00 and 8.50 ppm and a second peak between 4.00 and 4.40 ppm, indicates the presence of a synthetic indole or indazole cannabinoid. When two-dimensional Correlation Spectroscopy (COSY) NMR is used, detection of a first spot between 6.50 and 9.00 ppm and a second spot between 1.50 and 4.50 ppm indicates the presence of a synthetic indole or indazole cannabinoid. The method is performed in the absence of chromatography and optionally, may be used to quantify the amount of synthetic cannabinoid.

In another embodiment, the present invention provides a method for detecting synthetic indole and indazole cannabinoids in a botanical sample using one-dimensional proton NMR. In particular, a suspension having a solid botanical sample and a solvent is subject to an NMR spectroscopy process to produce a sample NMR spectrum. Synthetic indole or indazole cannabinoids are detected in the suspension by analysis of the sample NMR spectrum. When one-dimensional proton NMR spectroscopy is used, detection of a first peak between 8.00 and 8.50 ppm, a second peak between 4.00 and 4.40 ppm indicates the presence of a synthetic indole or indazole cannabinoid.

In another embodiment, the present invention provides a method for detecting synthetic indole and indazole cannabinoids in a botanical sample using COSY NMR. In particular, a suspension comprising a solid botanical sample and a solvent is subjected to an NMR spectroscopy process to produce a sample NMR spectrum. Synthetic indole or indazole cannabinoids in the suspension are detected by analysis of the sample NMR spectrum. When two-dimensional COSY NMR spectroscopy is used, detection of a first spot between 6.50 and 9.00 ppm and a second spot between 1.5 and 4.5 ppm. The claimed ranges for COSY NMR spots reflect the range for both axes.

DETAILED DESCRIPTION

Figure 1:
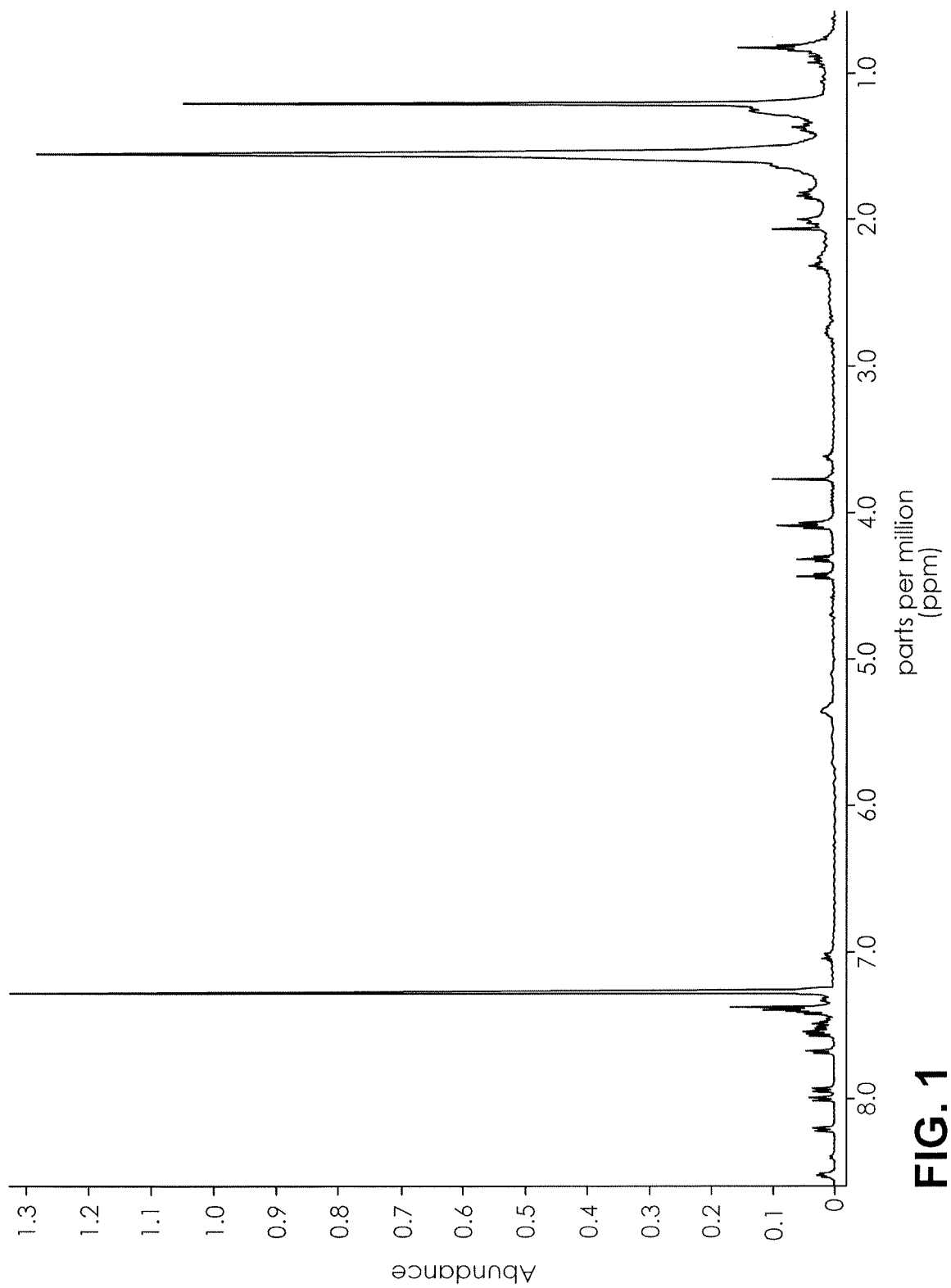
FIG. 1 depicts the one-dimensional proton NMR spectrum (9.0-0.5 ppm) of a botanical substance called AppleJacked.

The present invention provides a method for detecting synthetic indole or indazole cannabinoids. The method can be conducted without the need for any pre-analysis processing or destruction of the sample. The method first includes the step of providing a solid sample known or suspected to contain at least one synthetic indole or indazole cannabinoid and adding a deuterated solvent to the solid sample to create a suspension.

The solid sample can include any solid suspected of containing a synthetic indole or indazole cannabinoids. Examples of solid samples include botanicals. Examples of suitable botanicals include tobacco, *Canavalia maritima*, *Nymphaea caerulea*, *Scutellaria nana*, *Pedicularis densiflora*, *Leonotis leonurus*, *Zornia latifolia*, *Nelumbo nucifera*, *Tumera diffusa*, *Verascum thapsus* and *Leonurus sibiricus*. Other botanicals include plants from the genus *Artemisia*, including *Artemisia vulgaris* and *Artemisia argyi*. Further botanicals include plants from the genus *Mentha*, including *Mentha canadensis* and *Mentha piperita*. Preferably, the botanical is dried.

In one embodiment, the solid sample is a dried botanical commonly sold on the commercial market. The dried botanical may contain one or more plant species. These dried botanicals are commonly referred to as herbal incense, herbal smoking blends, or herbal potpourri; or collectively known as an herbal product. Examples include K2, Spice, AppleJacked, MrNiceGuy, Diablo, CloudNine, and Zohai.

In one embodiment, the sample size is between 10 and 100 mg, preferably between 25 and 75 mg, and more preferably the sample size is about 50 mg.

The synthetic indole or indazole cannabinoids are not naturally present in the solid sample and are added thereto in order to create a substance that mimics *cannabis*. As defined herein, synthetic indole or indazole cannabinoids include any chemical compound having an indole or indazole group, as shown in formula I and formula II respectively, with at least a CH attached to the nitrogen in position 1, denoted by *.

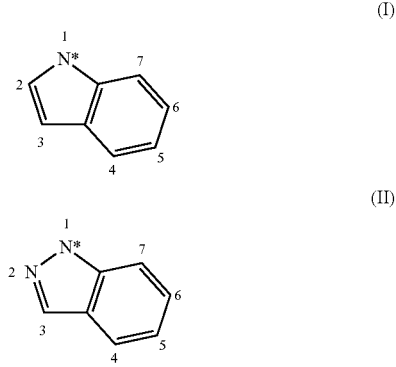

A deuterated solvent is added to the solid sample to create a suspension. Deuterated solvents are commonly known in the art. Any deuterated organic solvent compatible with NMR analysis of indole or indazole cannabinoids may be used. Examples of suitable deuterated solvents include: $D_2O$, $(CD_3)_2CO$, $CD_3OD$, $(CD_3)_2SO$, $CDCl_3$, $CD_3CN$, $C_2D_6O$, $C_3D_7OD$, or $CH_2Cl_2$. Preferably, the solvent is $(CD_3)_2CO$ or $CDCl_3$. These solvents may be used individually or in combination.

After addition of the solvent to the solid sample, the suspension is mixed. Methods to mix the suspension are commonly known in the art. For example, the suspension may be mixed by hand or by use of a vortex mixer. The suspension is mixed for a time sufficient for the synthetic cannabinoid to be released from the solid sample. For example, the suspension is mixed for at least 1 minute, preferably for at least 2 minutes, and more preferably for at least 3 minutes. In another embodiment, the mixing step may occur at room temperature.

After mixing, the suspension is subjected to a NMR spectroscopy process to produce a sample NMR spectrum. In one embodiment, the relaxation delay is at least 3.5 seconds, preferably at least 10 seconds, and even more preferably at least 20 seconds.

NMR is a technique used to obtain structural data of chemical compounds and proteins. NMR, as used herein, refers to a spectroscopic technique that exploits the magnetic properties of certain atomic nuclei to determine physical and chemical properties of atoms or the molecules in which they are contained. The technology relies on the phenomenon of nuclear magnetic resonance (NMR) and can provide detailed information about the structure, dynamics, reaction state, and chemical environment of molecules.

Typically, in NMR, a tube with a solution comprising the sample to be analyzed is placed in a magnet. Radio frequency radiation of appropriate energy is broadcast into the sample. A receiver coil surrounding the sample tube monitors the radio frequency absorbed. An NMR spectrum is acquired by varying or sweeping the magnetic field over a small range while observing the radio frequency signal from the sample, or by varying the frequency of the radio frequency radiation while holding the external field constant. In some embodiments, the whole frequency range of NMR, i.e., encompassing all (proton) chemical shifts is investigated. In nuclear magnetic resonance (NMR) spectroscopy, the chemical shift is the resonant frequency of a nucleus relative to a standard. The chemical shift in absolute terms is defined by the frequency of the resonance expressed with reference to a standard compound which is defined to be at 0 ppm.

When using one-dimensional proton NMR, two peaks are used to determine the presence of an indole or indazole cannabinoid. In a preferred embodiment, the sample is scanned a minimum of 32 times, more preferably, the sample is scanned a minimum of 64 times.

When hydrogen is in position 4 of an indole or indazole cannabinoid, the presence in the spectrum of a first peak between 8.00 and 8.50 ppm and a second peak between 4.00 and 4.40 ppm indicates the presence of an indole or indazole cannabinoid.

When a non-hydrogen substituent is in position 4 of an indole or indazole cannabinoid, the absence of a first signature peak in the region between 8.00 and 8.50 ppm, but the presence of a signature peak between 4.00 and 4.40 and between 7.30 and 7.90 are used to determine the presence of a synthetic indole or indazole cannabinoid.

When using two-dimensional COSY NMR, two spots are used to determine the presence of an indole or indazole cannabinoid. In a preferred embodiment, the sample is scanned a minimum of 1 times, preferably a minimum of 8 times, and even more preferably a minimum of 16 times.

Correlation Spectroscopy (COSY) NMR shows the frequencies for a single isotope, along both axes. COSY NMR is used to identify spins which are coupled to each other. In particular, it consists of a single radio frequency (RF) pulse followed by the specific evolution time followed by a second pulse followed by a measurement period. The frequencies are shown as spots on the COSY NMR spectrum.

The presence in the spectrum of a first spot between 6.5 and 9 ppm, representing aromatic proton-proton interactions; and a second spot between 1.5 and 4.5 ppm, representing aliphatic proton-proton interactions, indicates the presence of an indole or indazole cannabinoid.

When a non-hydrogen substituent is in position 4 in the indole or indazole cannabinoid, the absence of a first signature spot in the region between 6.50 and 9.00 ppm, and the presence of a signature spot between 1.50 and 4.5 ppm and between 1.50 and 4.50 ppm or between 6.50 and 9.00 ppm are used to determine the presence of a synthetic indole or indazole cannabinoid. The claimed ranges of COSY NMR spots reflect the range for both axes.

NMR analysis of samples containing multiple components result in overlapping resonances, which thus compromises the ability to measure or determine the contents of the mixture. Even a pure sample containing a single small molecule may often give rise to 20 or more peaks in the $^1$H NMR spectrum. Therefore, a solution with only a few compounds may lead to significant overlap of spectral signals, and identification of any one compound may be difficult with this technique.

Therefore, the prior art teaches pre-analysis processing to remove impurities and ensure that only a single compound or protein is present in a sample to be analyzed by NMR. Pre-analysis processing methods include multiple rounds of extraction, concentration, chromatography, and crystallization to remove impurities from their compound or protein of interest. As discussed above, these methods can be cumbersome, as well as time consuming.

The method of the invention can be conducted without the need for any pre-analysis processing. It has been unexpectedly discovered that the detection, identification, and optionally quantification of synthetic indole and indazole cannabinoid compounds in a solid sample do not require the laborious and time consuming pre-analysis processing prior to NMR, as taught by the prior art. This pre-analysis processing includes extraction, chromatography, or crystallization. Furthermore, the prior art teaches repeated steps of extraction, followed by concentration. The prior art also teaches that extraction and/or isolation is done with one solvent, and then the extract is dissolved in a second deuterated solvent for NMR analysis.

Furthermore, the method of the present invention may be practiced without the need for any additional analytical methods. For example, the present invention can be practiced without the need for mass spectrometry (MS) analysis in conjunction or prior to NMR analysis.

Extraction, as herein defined, is a process involving the application of process conditions beyond simply adding solvent and mixing to induce separation of an analyte from a solid sample.

One example of extraction is Soxhlet-extraction. In a Soxhlet-extraction, the removal of an analyte from a permeable solid sample is accomplished by means of a solvent which is continually evaporated from a still-pot and condensed in such a manner that it falls into and permeates through the sample which itself is held in a permeable container in a siphonable chamber. The resulting solvent contains the analyte, free from the solid sample.

Another example of extraction is the ultrasonication method. In this method, the removal and recovery of an analyte from a solid sample is accomplished by means of applying sound energy to a solid sample immersed in a solvent (a suspension). Energy may be introduced into the suspension by means of an ultrasonic probe which is inserted into the suspension or an ultrasonic bath containing the suspension. The ultrasonic energy may be strong enough to disrupt and pulverize the solid sample, thus increasing the extractability of the analyte. After application of sound energy to the suspension, the solvent is separated from the solid sample as described above.

Chromatography, as defined herein, is a method for resolving, separating, isolating, and/or purifying a selected analyte from its surrounding medium. Chromatography is a physical method of separation, in which components to be separated are distributed between two phases, one of these phases constituting a stationary bed of large surface area, the other being a fluid that percolates through or along the stationary bed. The separation of the phases relies on the basis of the target analyte's binding or interaction with an adsorbent bound to a solid phase support, which support is suspended in or contacted with the surrounding medium and which may be reclaimed or separated from said medium by disrupting the interaction between the selected molecule and the chromatographic material.

Examples of chromatography include thin layer chromatography (TLC) and column chromatography. Thin-layer chromatography ("TLC") employs a stationary phase that is spread in a thin layer on a carrier or substrate plate. A commonly-used stationary phase includes a silica-gel-based sorbent material. In column chromatography, the stationary phase is packed in the form of a cylindrical column.

In a typical MS procedure, an analyte is ionized, for example by bombarding it with electrons. This may cause some of the analyte's molecules to break into charged fragments. These ions are then separated according to their mass-to-charge ratio. The molecules are destroyed during ionization and fragmentation.

Crystallization is the process of formation of solid crystals precipitating from a solution. When two or more substances are dissolved in a solvent, either the desired compound or impurities can be coaxed out of solution. Crystallization methods to separate substances are commonly known in the art.

The method of the current invention is capable of detecting and specifically identifying the identity of synthetic indole or indazole cannabinoid(s) when at least one synthetic cannabinoid is present in the solid sample.

In one aspect, the present invention provides a method of detecting synthetic indole or indazole cannabinoid having formula (III); the arrows identify the hydrogens that generate the signature NMR peaks and the arrows also identify the hydrogens contributing to the COSY spots.

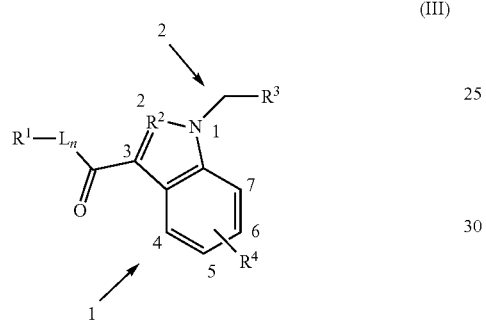

(III)

wherein L is NH, or $C_1$-$C_{12}$, straight-chain or branched alkyl, alkenyl, or alkynyl, n is 0 or 1, when n is 0, the adjacent carbons are directly linked, and not linked through L; $R^1$ is $C_2$-$C_8$($CONH_2$), $C_3$-$C_{12}$ alkyl, aryl, cycloalkyl, heterocyclyl, or heteroaryl, having a single cyclic ring or multiple condensed rings, wherein the ring may be substituted or unsubstituted; $R^2$ is CH, CH($CH_3$), or N; $R^3$ is $C_2$-$C_{12}$ straight-chain or branched alkyl, alkenyl, alkynyl, aryl, cycloalkyl, heterocyclyl, or heteroaryl, having a single cyclic ring or multiple condensed rings; and $R^4$ is hydrogen or $NO_2$.

In a preferred embodiment, the indole or indazole cannabinoid is one or more of the synthetic cannabinoids shown in Scheme 1.

Scheme 1

JWH-018

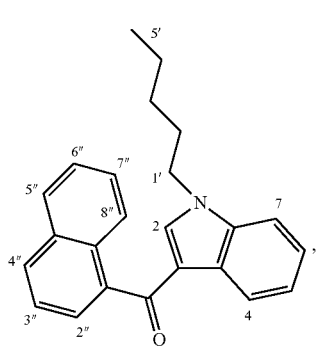

JWH-081

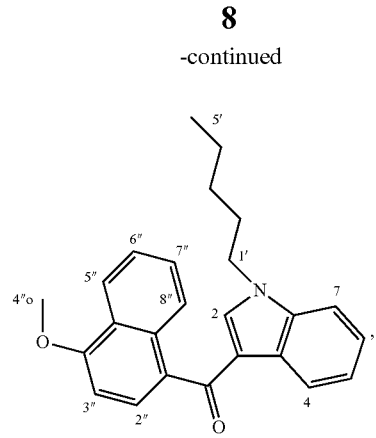

JWH-203

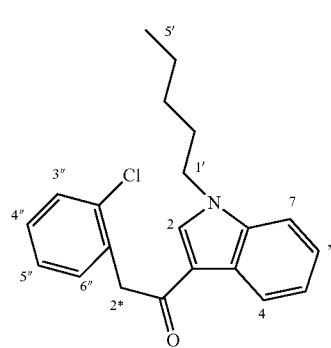

RCS-08

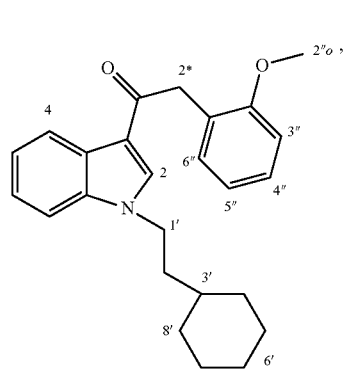

AM-2201

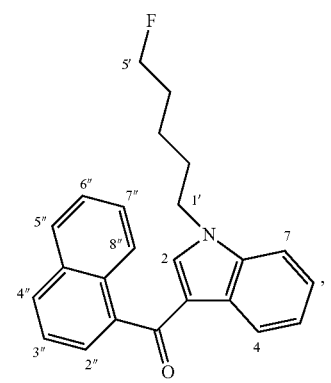

JWH-250
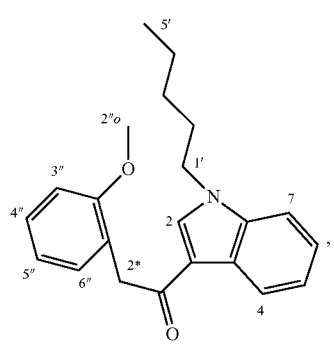
JWH-122
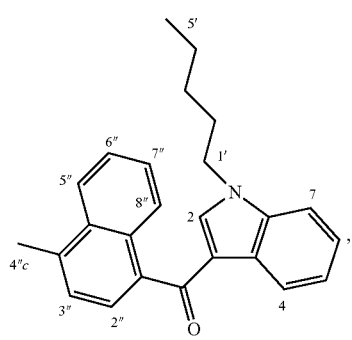
RCS-4
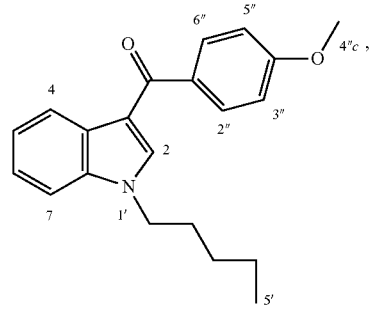
JWH-020
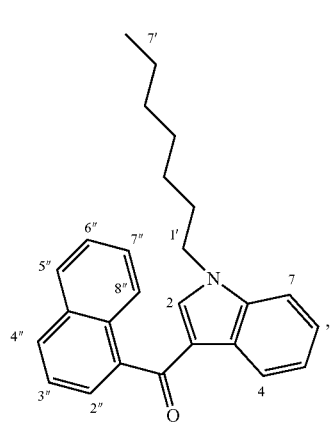
JWH-019
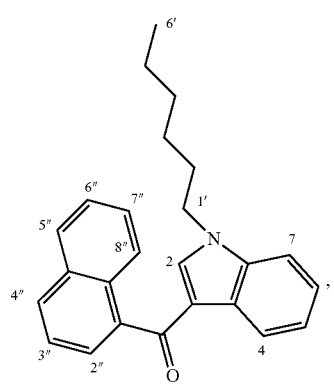
JWH-200
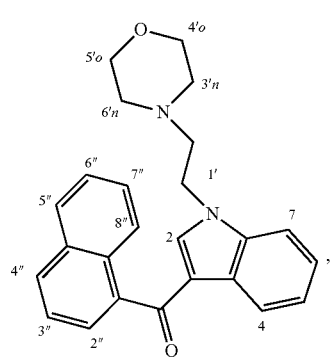
JWH-412
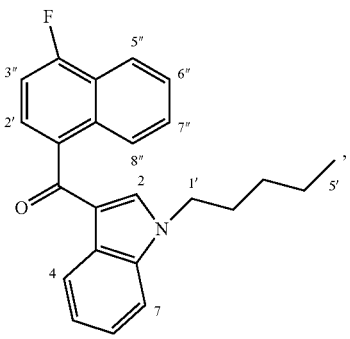
JWH-210
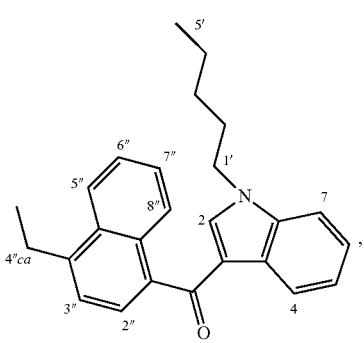

-continued

MAM-2201

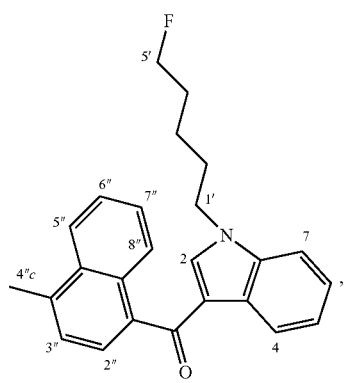

UR-144

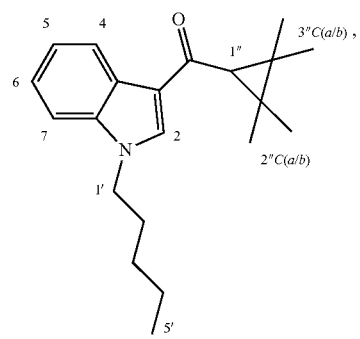

XLR-11

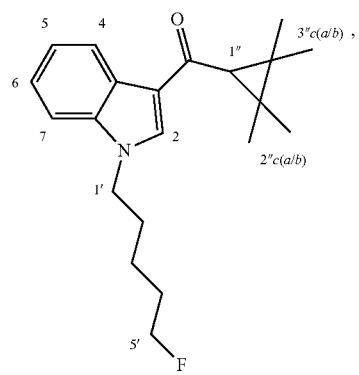

AKB-48

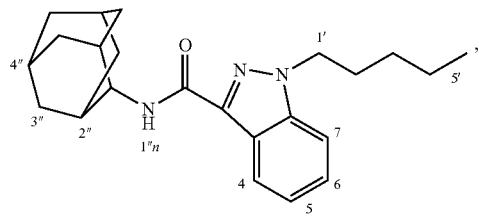

AB-FUBINACA

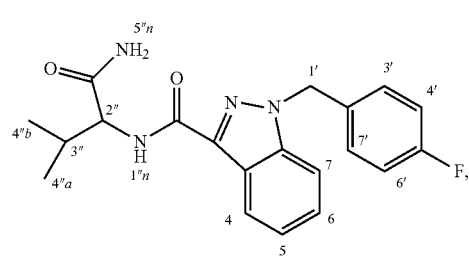

-continued

PB-22

PB-22 and
ADB-PINACA

The numbers in scheme 1 represent the position of hydrogen atoms referenced in Table 1 and Table 2, herein below.

When using one-dimensional proton NMR, and a hydrogen is present in position 4 of the indole or indazole cannabinoid, a third peak or set of peaks between 7.30 and 7.9 ppm provides the specific identity of the synthetic indole or indazole cannabinoids that may be present in the solid sample.

Figure 13:
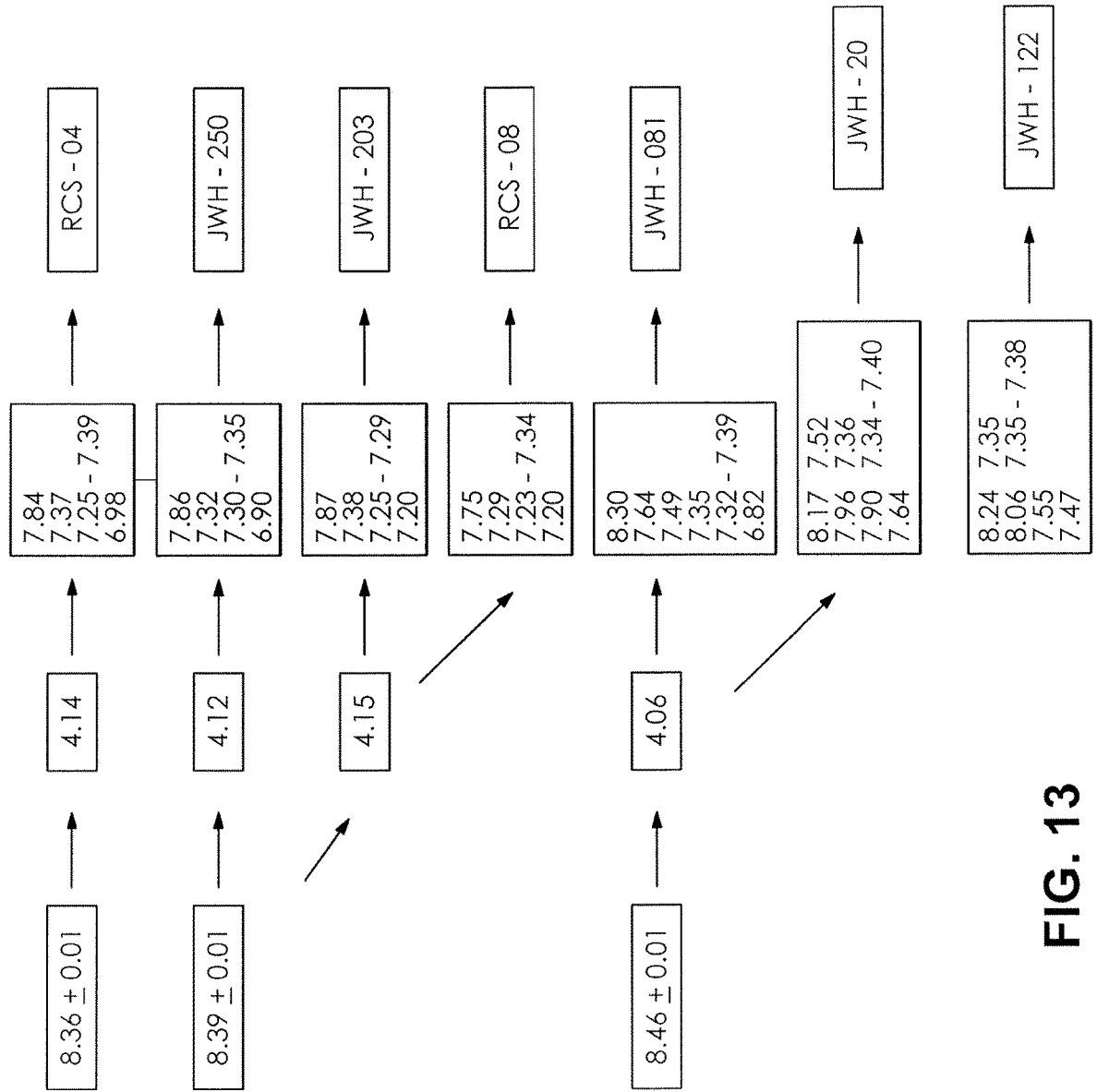
FIG. 13 depicts a flow chart detailing an example of the method used to detect and identify the specific synthetic indole or indazole cannabinoids using one-dimensional NMR.
Figure 13:
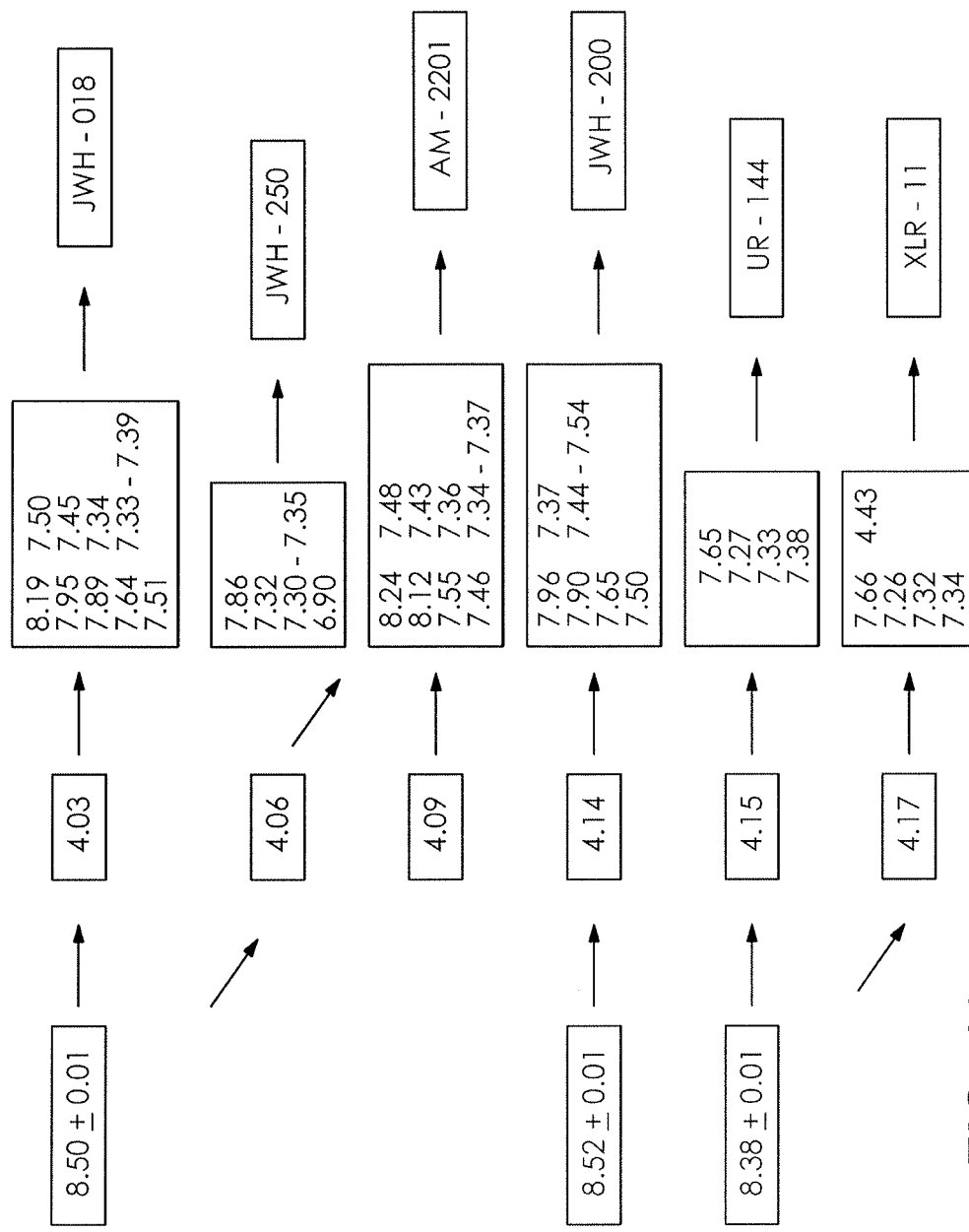

FIG. 13 depicts a flow chart detailing an example of the method used to detect and identify the specific identity of a synthetic indole or indazole cannabinoid using the one-dimensional NMR method.

When using two-dimensional COSY NMR, and hydrogen is present in position 4 of the indole or indazole cannabinoid, a third spot or set of spots between 1.50 and 4.50 ppm or between 6.50 and 9.00 ppm provides the specific identity of the synthetic indole or indazole cannabinoids that may be present in the solid sample.

Figure 14A:
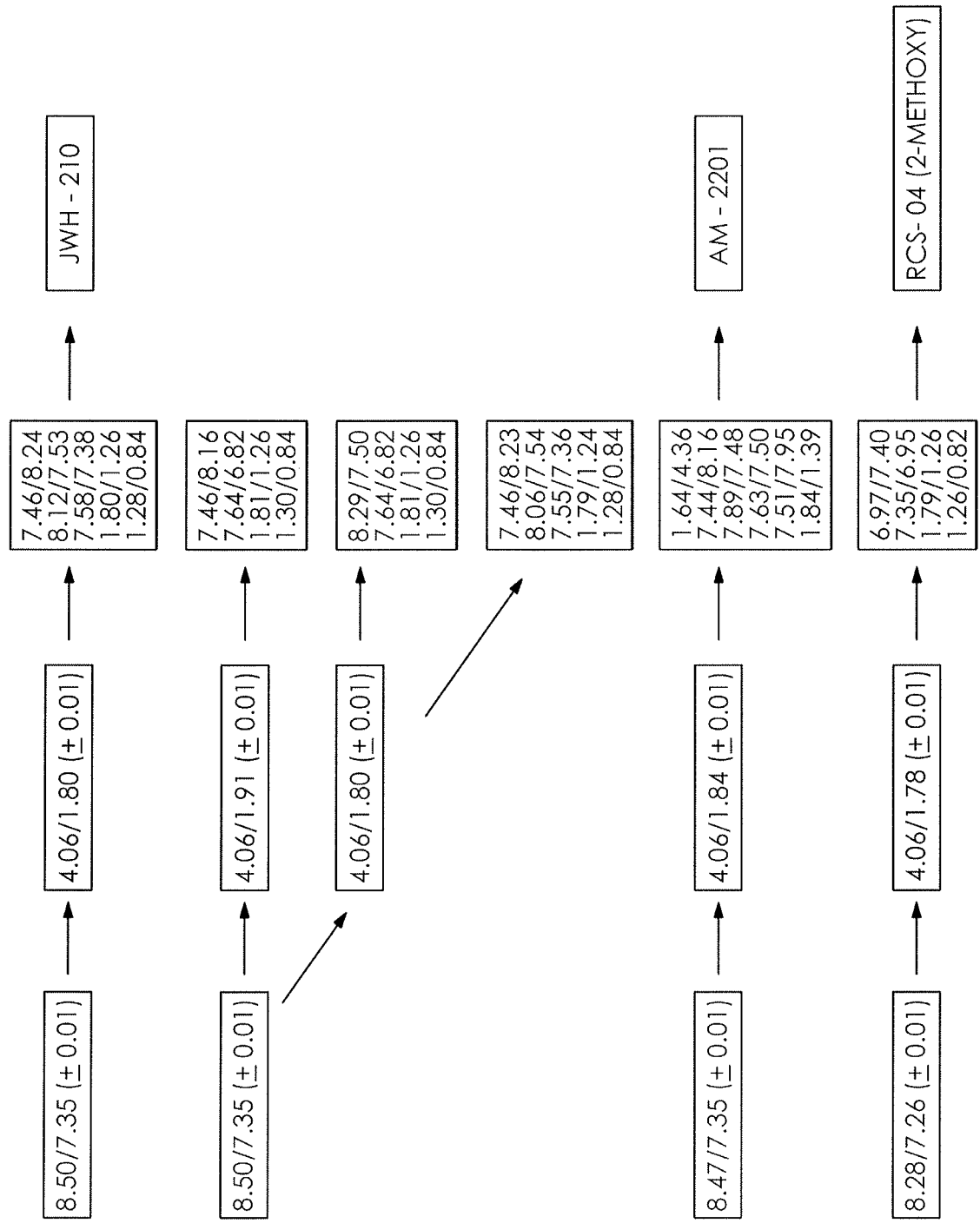
FIG. 14 depicts a flow chart detailing an example of the method used to detect and identify the specific synthetic indole or indazole cannabinoids using two-dimensional COSY NMR.
Figure 14B:
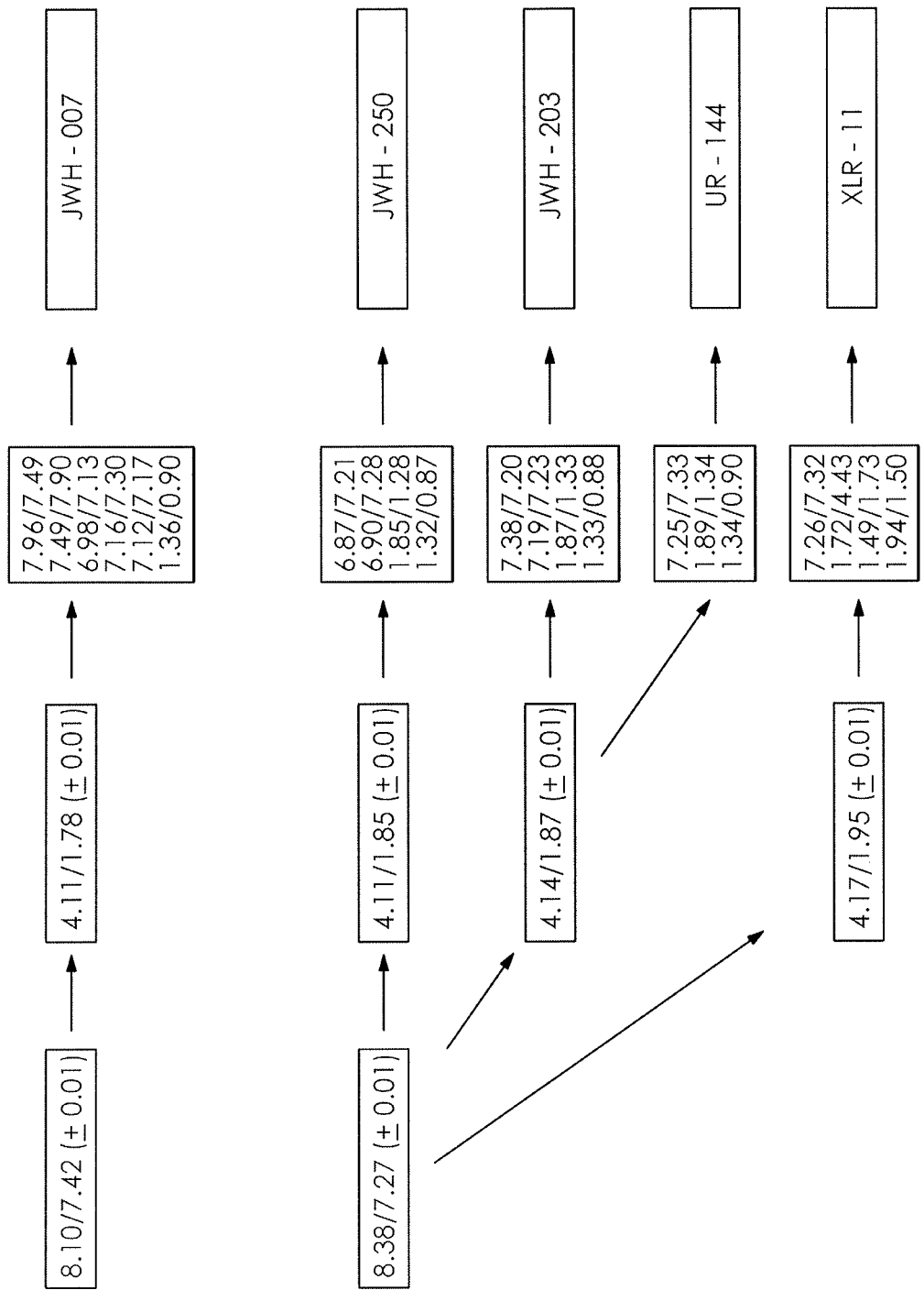

FIG. 14 depicts a flow chart detailing an example of the method used to detect and identify the specific identity of a synthetic indole or indazole cannabinoid using the two-dimensional COSY method.

The amount of above-mentioned synthetic cannabinoid may be quantified by any method known in the art. One such method involves the use of an internal standard. Examples of suitable internal standards include maleic acid (MA), 3,5,-dinitrobenzoic acid, dimethylsulphone, and 1,2,4,5-tetramethylbenzyene.

Using maleic acid as an internal standard, the amount of cannabinoid in a sample can be calculated by applying the following equation, wherein MA is maleic acid, FW is formula weight (g/mol), and integral is the integrated area under the NMR peak.

$$\text{mg of Cannabinoid} = \frac{(\text{mg of } MA)\left(\frac{\text{\# of protons in } MA}{FW \text{ of } MA}\right) (\text{Integral of Cannabinoid Peak})}{(\text{Integral of } MA \text{ Peak})\left(\frac{\text{\# of protons represented by Cannabinoid Peak}}{FW \text{ of Cannabinoid}}\right)}$$

It should be understood and appreciated that additional external standardization processes, such as electronic quantitating methods may also be used in addition to and/or in conjunction with the selective NMR processes of the present disclosure. As such, the present teachings are not intended to be limiting in nature herein.

While exemplary embodiments incorporating the principles of the present teachings have been disclosed hereinabove, the present teachings are not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

Throughout this specification, quantities are defined by ranges, and by lower and upper boundaries of ranges. Each lower boundary can be combined with each upper boundary to define a range. The lower and upper boundaries should each be taken as a separate element.

Reference throughout this specification to "one embodiment," "an embodiment," "one example," or "an example" means that a particular feature, structure or characteristic described in connection with the embodiment or example is included in at least one embodiment of the present embodiments. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

In this specification, groups of various parameters containing multiple members are described. Within a group of parameters, each member may be combined with any one or more of the other members to make additional sub-groups. For example, if the members of a group are a, b, c, d, and e, additional sub-groups specifically contemplated include any one, two, three, or four of the members, e.g., a and c; a, d, and e; b, c, d, and e; etc.

EXAMPLES

The present invention is illustrated in further details by the following non-limiting examples.

Example 1

Proton NMR Spectrum of AppleJacked

Figure 2:
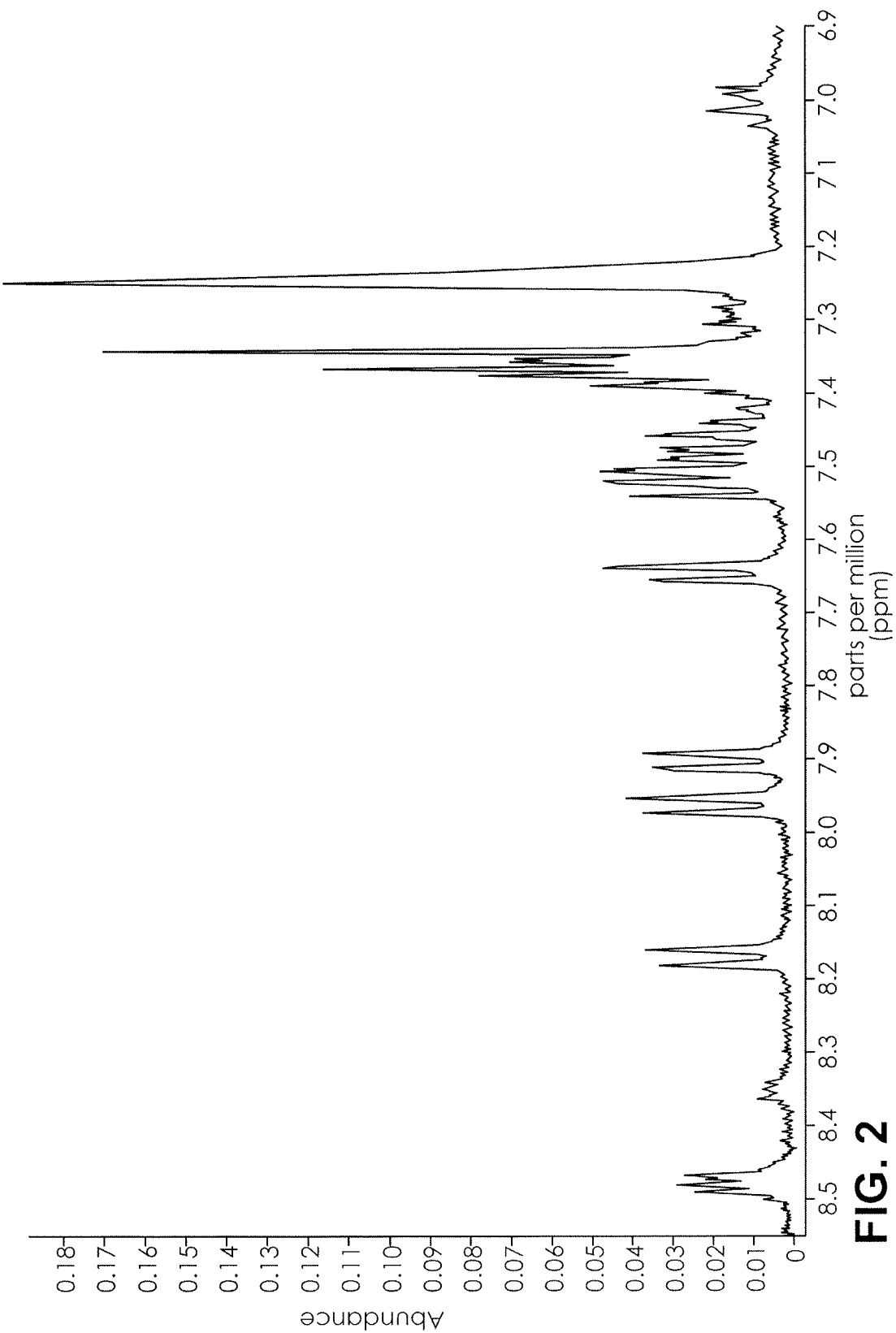
FIG. 2 depicts the one-dimensional proton NMR spectrum (8.6-9.0 ppm) of a botanical substance called AppleJacked.
Figure 3:
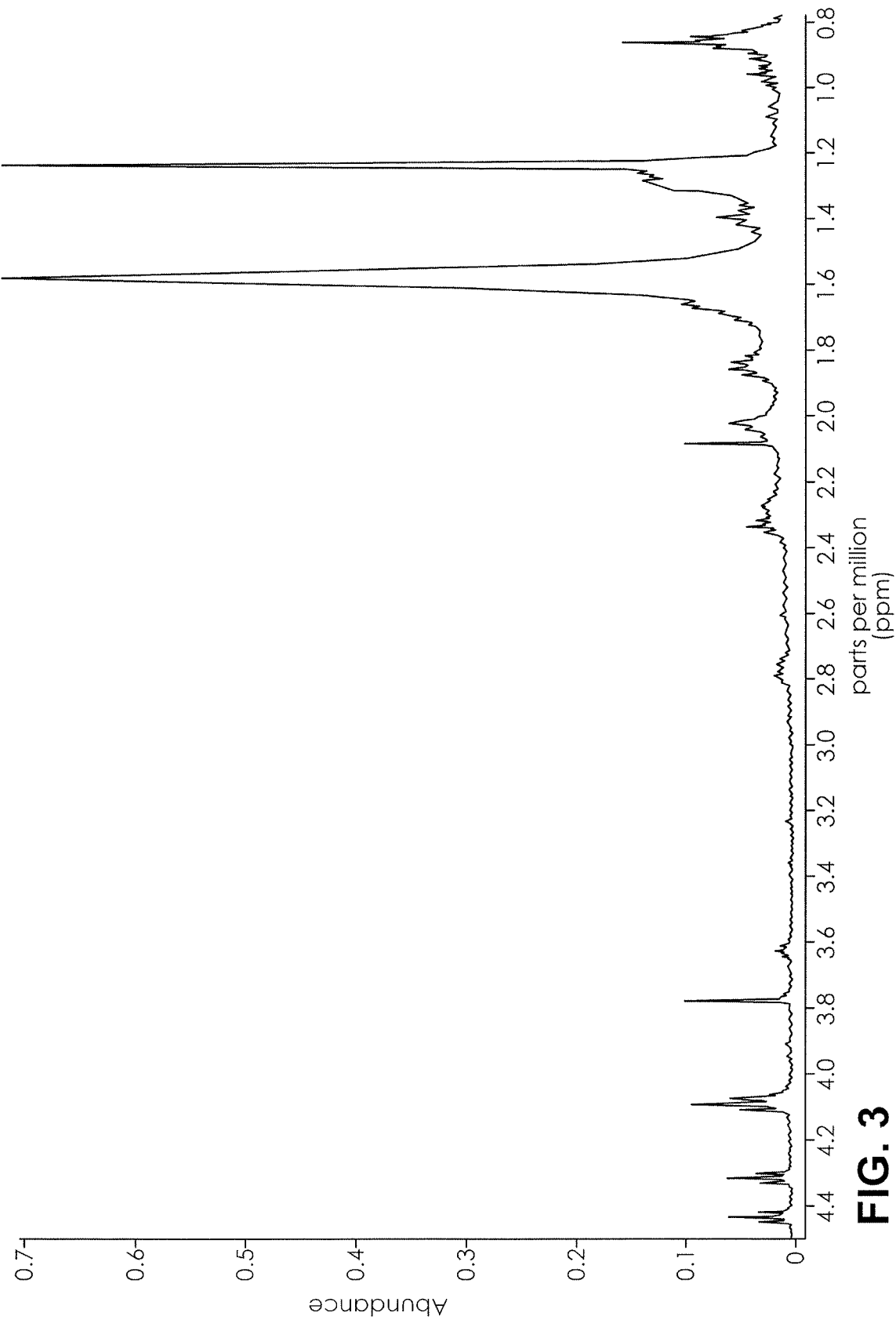
FIG. 3 depicts the one-dimensional proton NMR spectrum (4.5-0.7 ppm) of a botanical substance called AppleJacked.

An herbal product named AppleJacked was obtained. 0.5 mL of CDCl$_3$ was added to 50 mg of AppleJacked, and mixed for 3 minutes. The suspension was analyzed by 1H NMR in a 400 MHz NMR using a proton program run having a 4 second relaxation time and 32 scans. The range was set from 0-10 ppm, and the auto gain setting was on. The NMR spectrum is depicted in FIG. 1-3.

Example 2

COSY NMR Spectrum of AppleJacked

Figure 4:
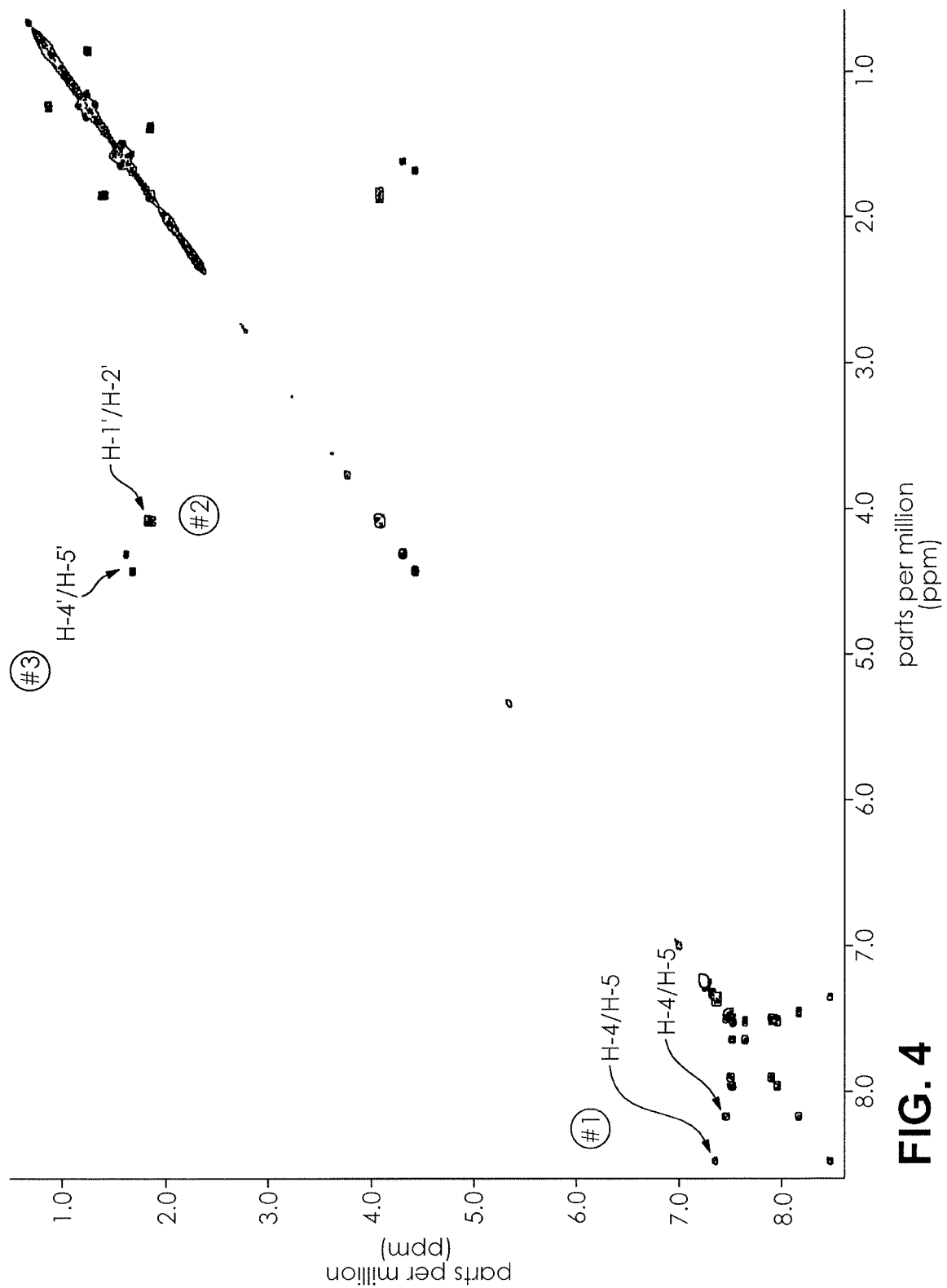
FIG. 4 depicts the two-dimensional COSY NMR spectrum (9.0-0.5 ppm) of a botanical substance called AppleJacked. Signature spots as well as source hydrogens are also identified.

An herbal product named AppleJacked was obtained. 0.5 mL of CDCl$_3$ was added to 50 mg of AppleJacked, and mixed for 3 minutes. The suspension was analyzed by COSY NMR in a 400 MHz NMR using a proton-proton correlation program run having a 1.5 second relaxation time and 1 scan. The range was set from 0-10 ppm, and the spin state setting was off. The annotated NMR spectrum is depicted in FIG. 4. Two synthetic cannabinoids were identified in this sample, AM-2201 and RCS-04.

Example 3

Proton NMR Spectrum of CloudNine

Figure 5:
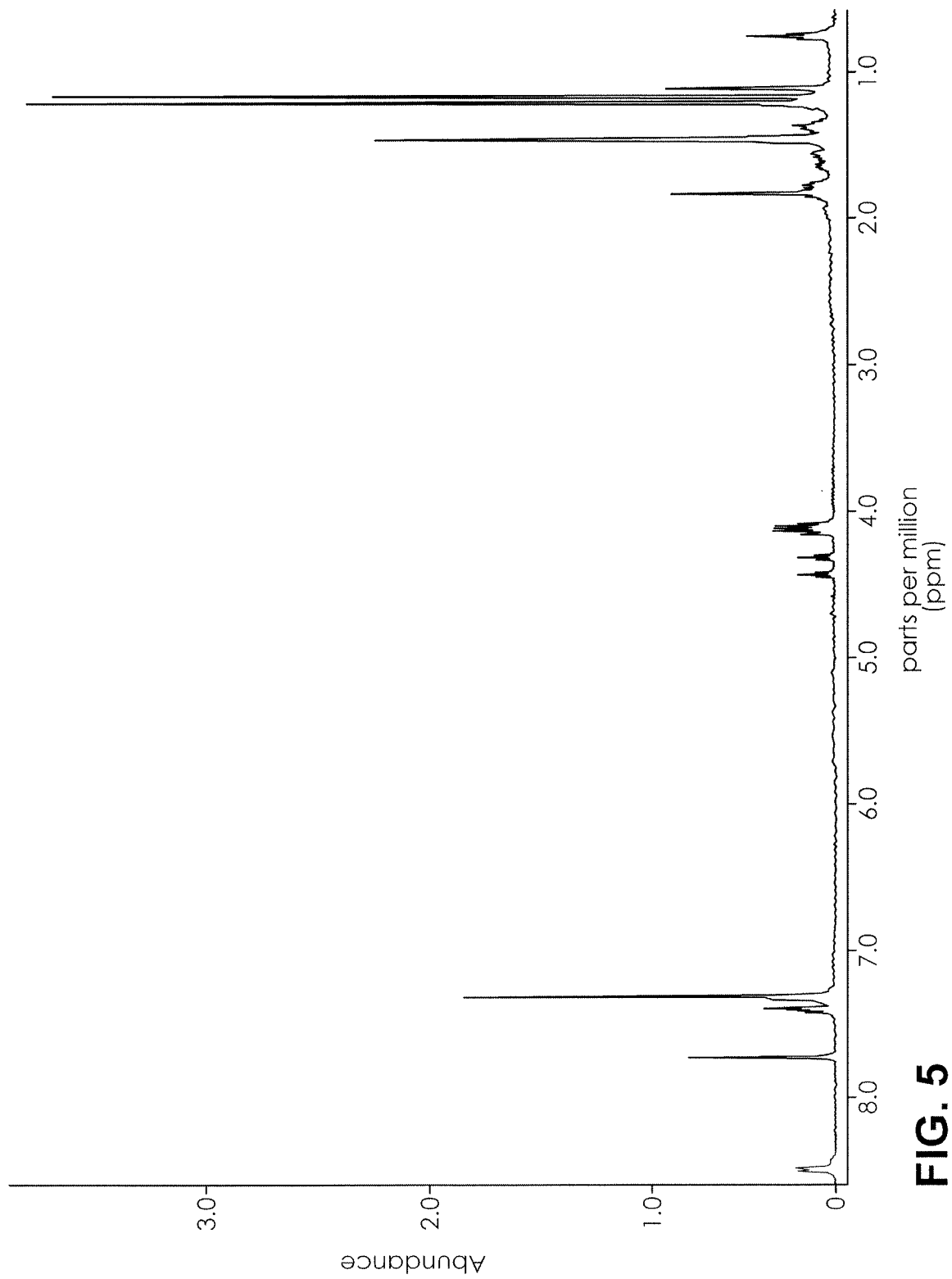
FIG. 5 depicts the one-dimensional proton NMR spectrum (9.0-0.5 ppm) of a botanical substance called Cloud-Nine.
Figure 6:
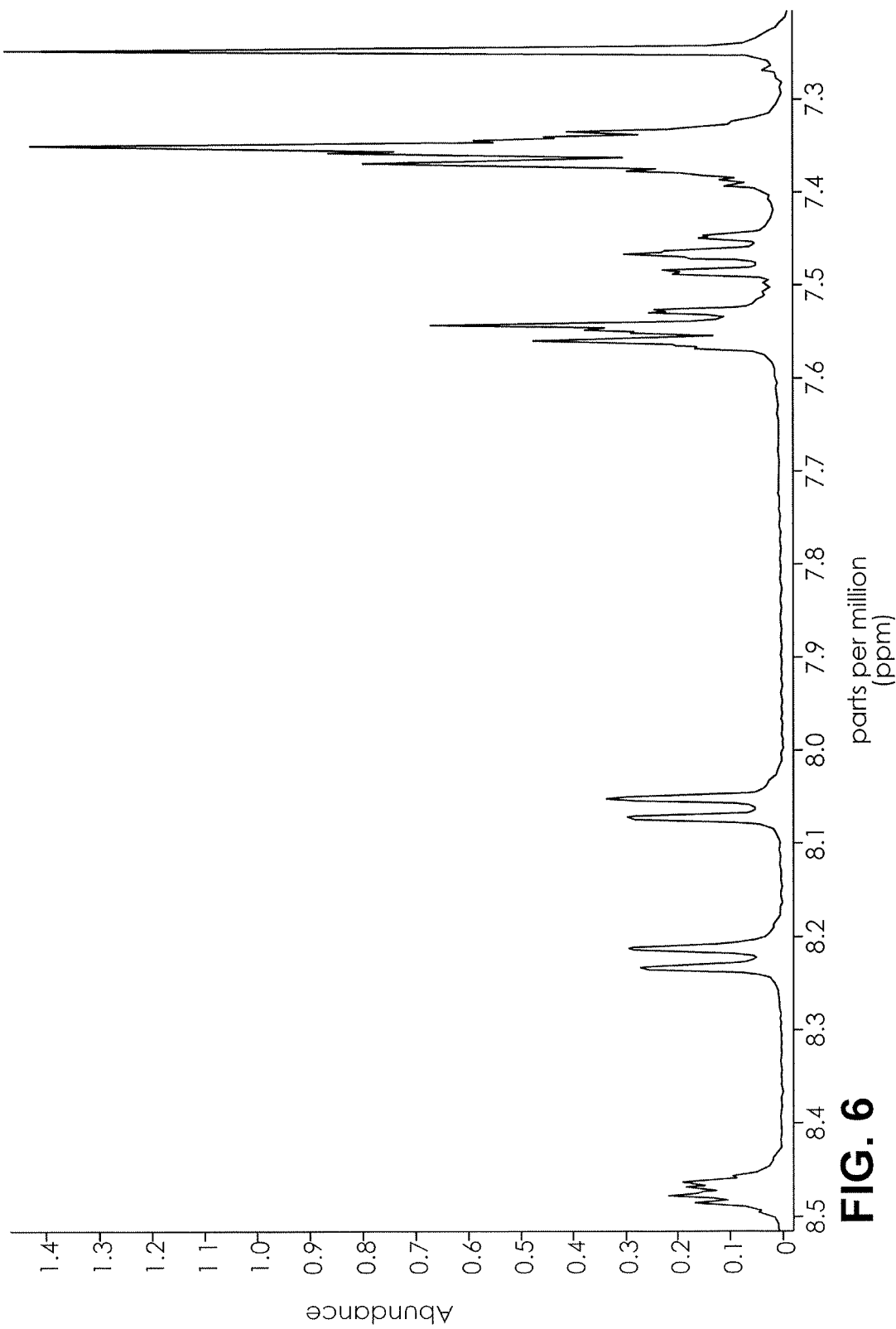
FIG. 6 depicts the one-dimensional proton NMR spectrum (8.6-7.0 ppm) of a botanical substance called Cloud-Nine.
Figure 7:
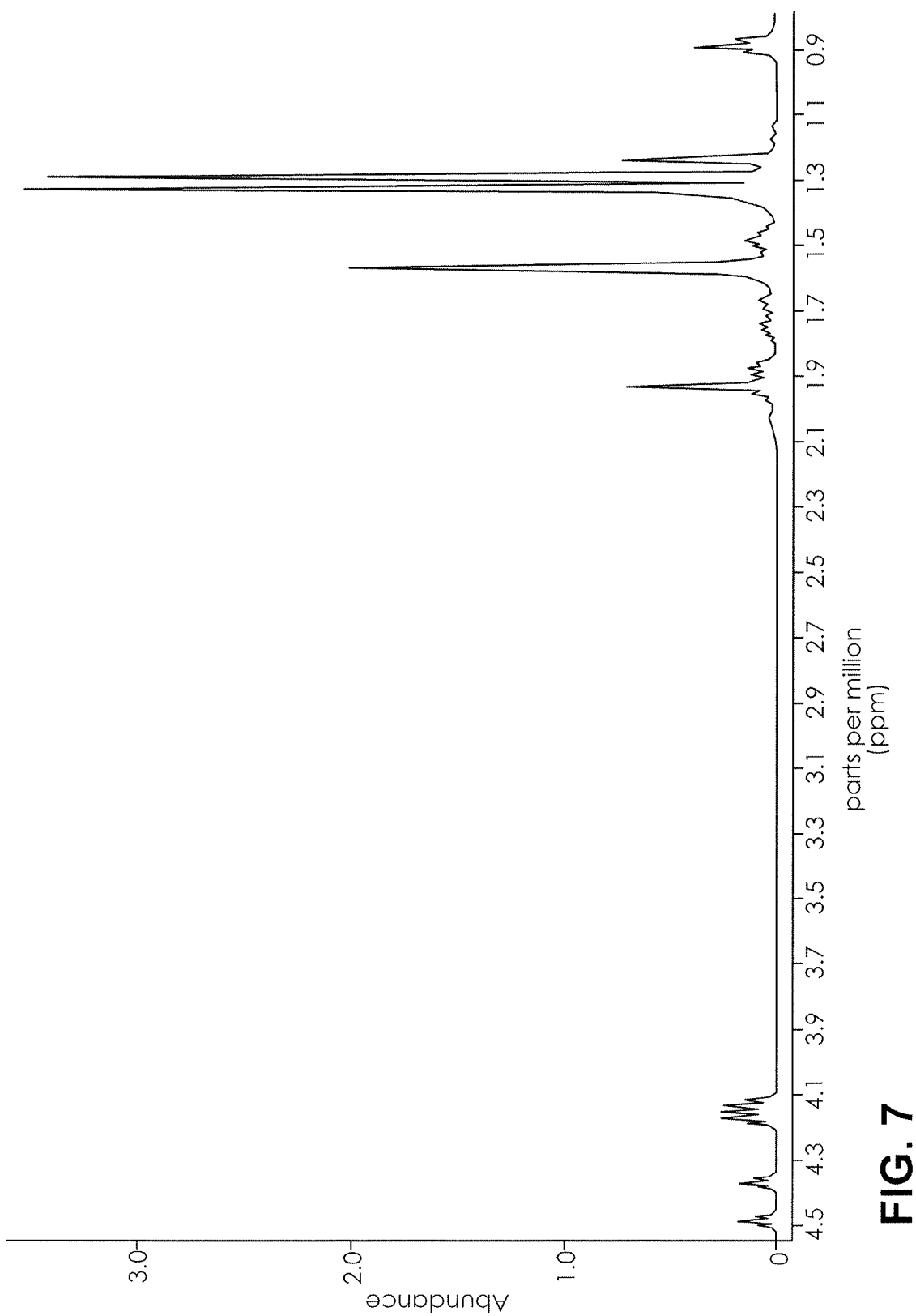
FIG. 7 depicts the one-dimensional proton NMR spectrum (4.6-0.7 ppm) of a botanical substance called Cloud-Nine.

An herbal product named CloudNine was obtained. 0.5 mL of CDCl$_3$ was added to 50 mg of CloudNine, and mixed for 3 minutes. The suspension was analyzed by 1H NMR in a 400 MHz NMR using a proton program run having a 4 second relaxation time and 32 scans. The range was set from 0-10 ppm, and the auto gain setting was on. The NMR spectrum is depicted in FIG. 5-7.

Example 4

COSY NMR Spectrum of CloudNine

Figure 8:
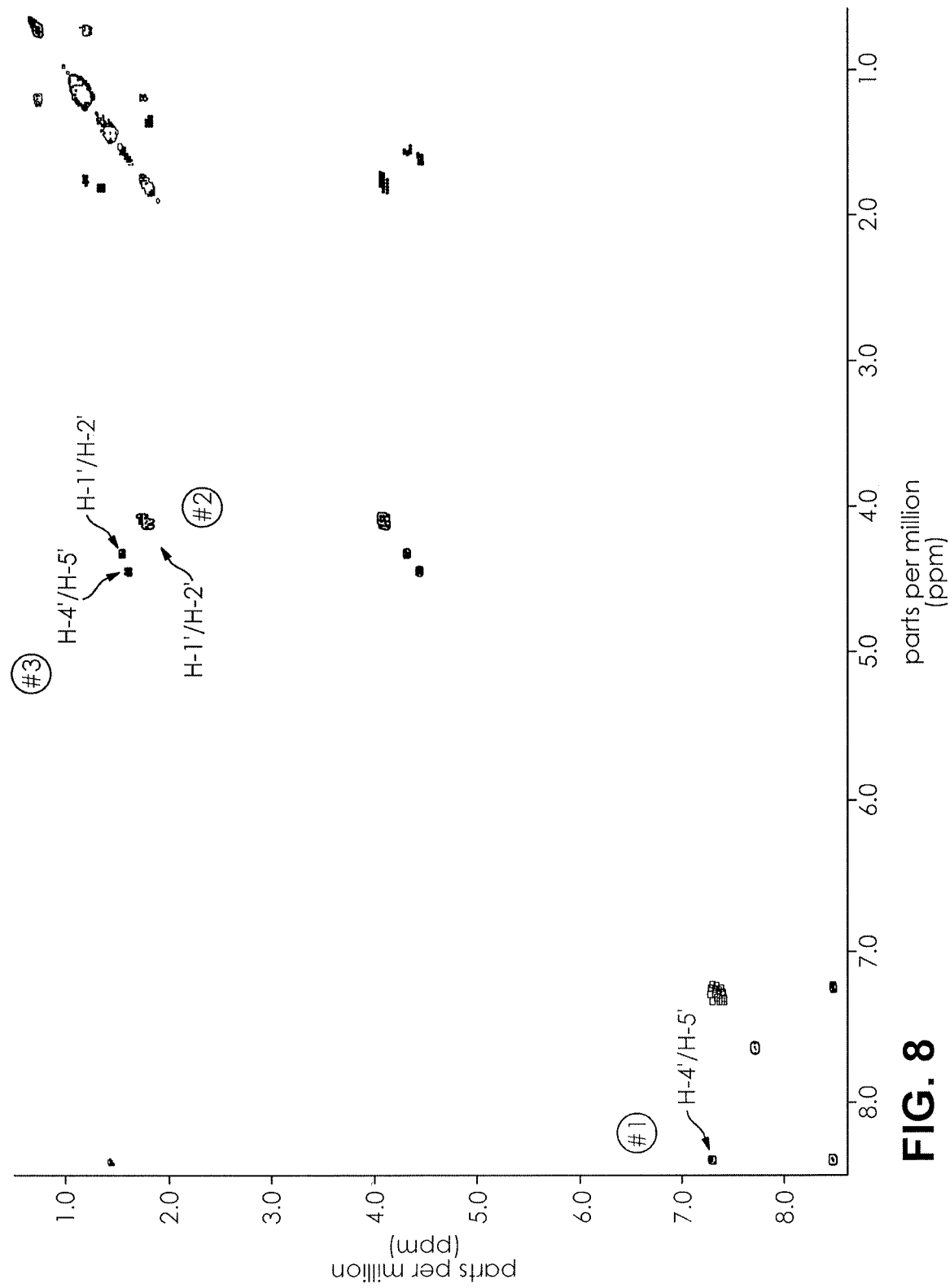
FIG. 8 depicts the two-dimensional COSY NMR spectrum (9.0-0.5 ppm) of a botanical substance called Cloud-Nine. Signature spots as well as source hydrogens are also identified.

An herbal product named CloudNine was obtained. 0.5 mL of $CDCl_3$ was added to 50 mg of CloudNine, and mixed for 3 minutes. The suspension was analyzed by COSY NMR in a 400 MHz NMR using a proton-proton correlation program run having a 1.5 second relaxation time and 1 scan. The range was set from 0-10 ppm, and the spin state setting was off. The annotated NMR spectrum is depicted in FIG. 8. Two synthetic cannabinoids were identified in this sample, XLR-11 and UR-144.

Example 5

Proton NMR Spectrum of Diablo

Figure 9:
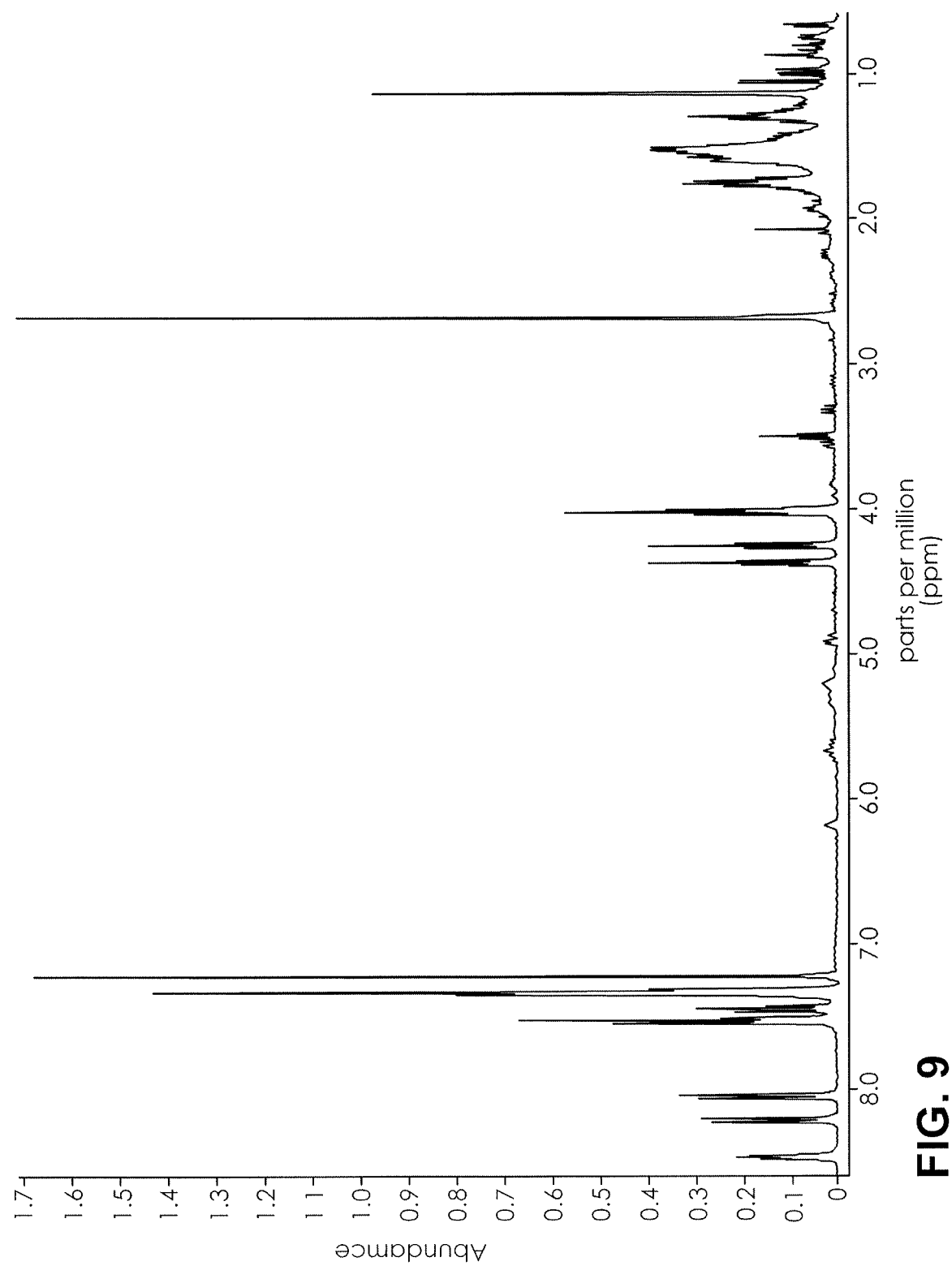
FIG. 9 depicts the one-dimensional proton NMR spectrum (9.0-0.5 ppm) of a botanical substance called Diablo.

An herbal product named Diablo was obtained. 0.5 mL of $CDCl_3$ was added to 50 mg of Diablo, and mixed for 3 minutes. The suspension was analyzed by 1H NMR in a 400 MHz NMR using a proton program run having a 4 second relaxation time and 32 scans. The range was set from 0-10 ppm, and the auto gain setting was on. The NMR spectrum is depicted in FIG. 9.

Example 6

COSY NMR Spectrum of Diablo

Figure 10:
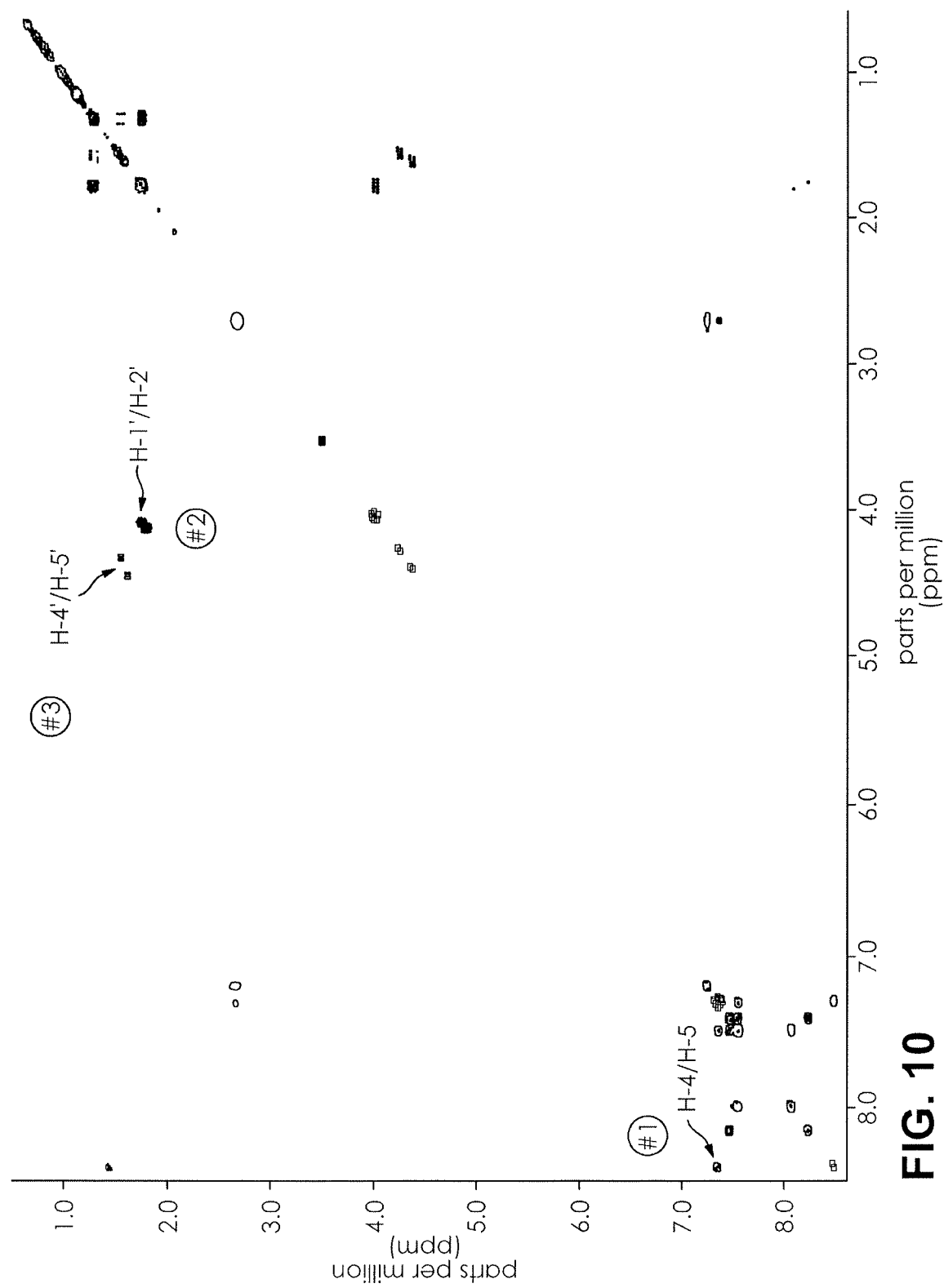
FIG. 10 depicts the two-dimensional COSY NMR spectrum (9.0-0.5 ppm) of a botanical substance called Diablo. Signature spots as well as source hydrogens are also identified.

An herbal product named Diablo was obtained. 0.5 mL of $CDCl_3$ was added to 50 mg of Diablo, and mixed for 3 minutes. The suspension was analyzed by COSY NMR in a 400 MHz NMR using a proton-proton correlation program run having a 1.5 second relaxation time and 1 scan. The range was set from 0-10 ppm, and the spin state setting was off. The annotated NMR spectrum is depicted in FIG. 10. Synthetic cannabinoid MAM-2201 was identified.

Example 7

Proton NMR Spectrum of MrNiceGuy

Figure 11:
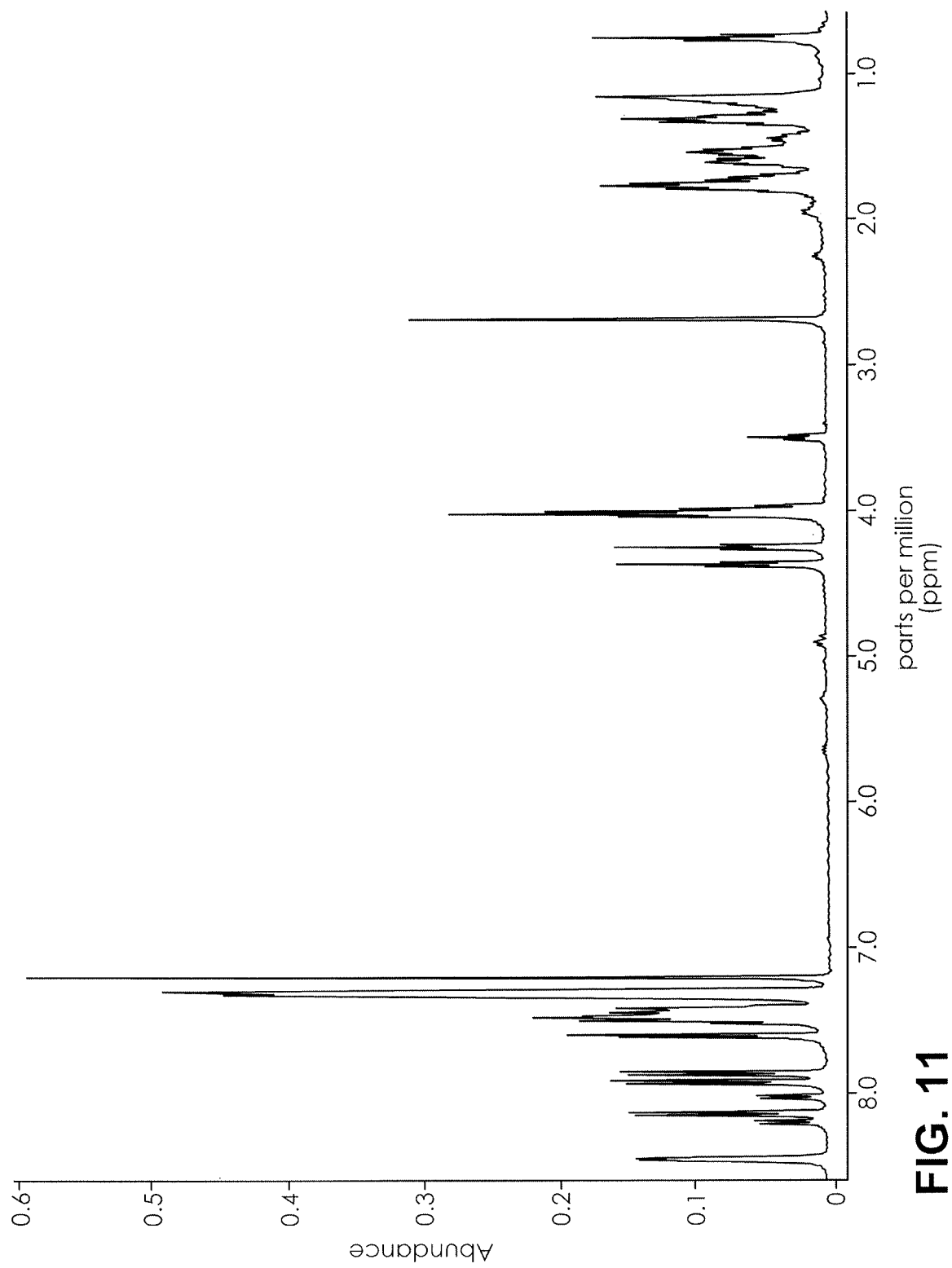
FIG. 11 depicts the one-dimensional proton NMR spectrum (9.0-0.5 ppm) of a botanical substance called MrNiceGuy.

An herbal product named MrNiceGuy was obtained. 0.5 mL of $CDCl_3$ was added to 50 mg of MrNiceGuy, and mixed for 3 minutes. The suspension was analyzed by 1H NMR in a 400 MHz NMR using a proton program run having a 4 second relaxation time and 32 scans. The range was set from 0-10 ppm, and the auto gain setting was on. The NMR spectrum is depicted in FIG. 11.

Example 8

COSY NMR Spectrum of MrNiceGuy

Figure 12:
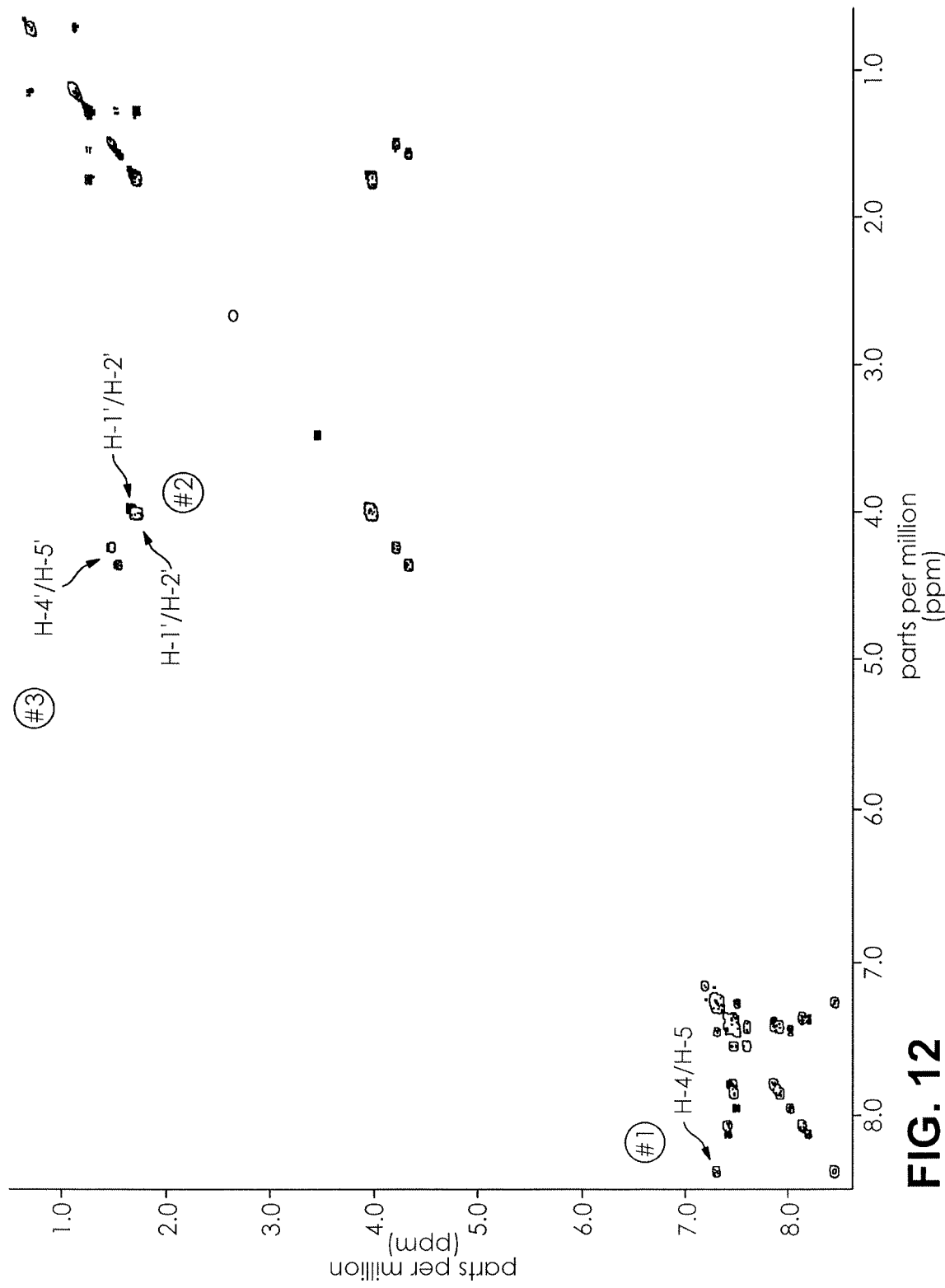
FIG. 12 depicts the two-dimensional COSY NMR spectrum (9.0-0.5 ppm) of a botanical substance called MrNiceGuy. Signature spots as well as source hydrogens are also identified.

An herbal product named MrNiceGuy was obtained. 0.5 mL of $CDCl_3$ was added to 50 mg of MrNiceGuy, and mixed for 3 minutes. The suspension was analyzed by COSY NMR in a 400 MHz NMR using a proton-proton correlation program run having a 1.5 second relaxation time and 1 scan. The range was set from 0-10 ppm, and the spin state setting was off. The annotated NMR spectrum is depicted in FIG. 12. Two synthetic cannabinoids were identified in this sample, AM-2201 and JWM-122.

Example 9

Proton NMR Spectrum of Synthetic Indole or Indazole Cannabinoids Isolated from Commercially Available Herbs, or Purchased in Purified Form 0.5 mL of $CDCl_3$ was added to 50 mg of commercially available herbal mixtures, and mixed for 3 minutes. The suspension was analyzed by 1H NMR in a 400 MHz NMR using a proton program run having a 4 second relaxation time and 32 scans. The range was set from 0-10 ppm, and the auto gain setting was on. The NMR peaks are reported in TABLE 1.

Example 10

COSY NMR Spectrum of Synthetic Indole or Indazole Cannabinoids Isolated from Commercially Available Herbs, or Purchased in Purified Form 0.5 mL of $CDCl_3$ was added to 50 mg of commercially available herbal mixtures, and mixed for 3 minutes. The suspension was analyzed by COSY NMR in a 400 MHz NMR using a proton-proton correlation program run having a 1.5 second relaxation time and 1 scan. The range was set from 0-10 ppm, and the spin state setting was off. The annotated NMR spectrum is depicted in FIG. 12.

TABLE 1

| | $CDCl_3$ Proton STANDARDS (Avg. Method) | | | | | | | |
|---|---|---|---|---|---|---|---|---|
| Label Actual | Reference JWH-018 | RCS-04 as labeled M.I. | RCS-04 (in Acetone) Cayman | "AM-1221" AM-2201 (Impurities) | "AM-2201" JWH-019 | JWH-081 as labeled | "JWH-122" JWH-200 | JWH-20 as labeled |
| H-2 | 7.34 | 7.58 S | 7.88 S | 7.36 M | 7.34 S | 7.35 M | 7.37 M | 7.36 M |
| H-4 | 8.49 | 8.36 M | 8.32 D | 8.48 M | 8.48 M | 8.46 M | 8.52 M | 8.47 M |
| H-5 | 7.33-7.39 | 7.30 M | 7.18-7.27 M | 7.35 M | 7.35 M | 7.34 M | 7.36 M | 7.34-7.40 |
| H-6 | 7.33-7.39 | 7.32 M | 7.18-7.27 M | 7.36 M | 7.33 M | 7.32-7.39 | 7.44-7.54 | 7.34-7.40 |
| H-7 | 7.33-7.39 | 7.38 M | 7.52 D | 7.40 M | 7.37 M | 7.32-7.39 | 7.44-7.54 | 7.34-7.40 |
| H-1" | — | — | — | — | — | — | — | — |
| H-2" | 7.64 | 7.84 D | 7.80 D | 7.64 M | 7.65 Dd | 7.64 D | 7.65 D | 7.64 M |
| H-3" | 7.51 | 6.98 D | 6.99 D | 7.52 M | 7.50 M | 6.82 D | 7.51 M | 7.52 M |
| H-4" | 7.95 | — | — | 7.97 D | 7.96 D | — | 7.96 D | 7.96 D |
| H-5" | 7.89 | 6.98 D | 6.99 D | 7.91 D | 7.90 D | 8.29 M | 7.90 D | 7.90 D |
| H-6" | 7.5 | 7.84 D | 7.80 D | 7.50 M | 7.51 M | 7.50 M | 7.49 M | 7.52 M |
| H-7" | 7.45 | — | — | 7.45 M | 7.45 M | 7.50 M | 7.46 M | 7.52 M |
| H-8" | 8.19 | — | — | 8.17 D | 8.18 D | 8.34 M | 8.16 D | 8.17 D |
| H-1' | 4.03 | 4.15 T | 4.29 T | 4.09 T | 4.06 T | 4.07 T | 4.14 M | 4.06 T |

TABLE 1-continued

| Label | | | | | | | | |
|---|---|---|---|---|---|---|---|---|
| H-2' | 1.78 | 1.87 M | 1.86 M | 1.84 M | 1.79 M | 1.80 M | 2.69 S | 1.79 M |
| H-3' | 1.22 | 1.32 M | 1.29 M | 1.38 M | 1.23 M | 1.26 M | — | 1.24 M |
| H-4' | 1.27 | 1.33 M | 1.29 M | 1.63 M | 1.25 M | 1.30 M | — | 1.24 M |
| H-5' | 0.84 | 0.88 T | 0.81 T | 4.36 Dt | 1.23 M | 0.84 M | — | 0.83 T |
| H-6' | — | — | — | — | 0.82 T | — | — | 1.55 S |
| H-7' | — | — | — | — | — | — | — | 1.55 S |
| H-8' | — | — | — | — | — | — | — | — |
| H-2C | — | — | — | — | — | — | — | — |
| H-1"N | — | — | — | — | — | — | — | — |
| H-2"C(a/b) | — | — | — | — | — | — | — | — |
| H-3"C(a/b) | — | — | — | — | — | — | — | — |
| H-2"O | — | — | — | — | — | — | — | — |
| H-3"O | — | — | — | — | — | — | — | — |
| H-4"a | — | — | — | — | — | — | — | — |
| H-4"b | — | — | — | — | — | — | — | — |
| H-4"O | — | 3.88 S | 3.84 S | — | — | 4.06 S | — | — |
| H-4"C | — | — | — | — | — | — | — | — |
| H-4"Ca | — | — | — | — | — | — | — | — |
| H-4"Cb | — | — | — | — | — | — | — | — |
| H-5"N | — | — | — | — | — | — | — | — |
| H-3'N | — | — | — | — | — | — | 2.38 T | — |
| H-6'N | — | — | — | — | — | — | 2.38 T | — |
| H-4'O | — | — | — | — | — | — | 3.54 M | — |
| H-5'O | — | — | — | — | — | — | 3.54 M | — |
| 2* | — | — | — | — | — | — | — | — |
| MeOH | — | — | — | — | — | — | — | — |
| Acetone | — | — | 2.00 S | — | — | — | — | — |

CDCl$_3$ Proton STANDARDS

| Label Actual | JWH-203 as labeled (Impurities) | JWH-250 as labeled | JWH-122 Cayman | AM-2201 Cayman | JWH-210 Cayman | UR-144 Cayman | RCS-08 as labeled | RCS-08 Isomer (3-methoxy) |
|---|---|---|---|---|---|---|---|---|
| H-2 | 7.87 S | 7.86 S | 7.35 M | 7.34 S | 7.36 M | 7.65 S | 7.87 S | 7.76 S |
| H-4 | 8.39 M | 8.40 M | 8.47 M | 8.48 M | 8.49 M | 8.39 M | 8.39 M | 8.40 M |
| H-5 | 7.28 M | 7.25 M | 7.34 M | 7.34 M | 7.34 M | 7.27 M | 7.23-7.34 | 7.23-7.34 |
| H-6 | 7.33 M | 7.25-7.32 | 7.37 M | 7.37 M | 7.40 M | 7.33 M | 7.23-7.34 | 7.23-7.34 |
| H-7 | 7.36 M | 7.25-7.32 | 7.40 M | 7.40 M | 7.32-7.41 | 7.38 M | 7.23-7.34 | 7.23-7.34 |
| H-1" | — | — | — | — | — | 1.94 S | — | — |
| H-2" | — | — | 7.55 T | 7.65 D | 7.58 D | — | — | 6.88 S |
| H-3" | 7.38 M | 6.87 D | 7.35 D | 7.50 D | 7.38 M | — | 6.88 D | — |
| H-4" | 7.19 M | 7.21 M | — | 7.96 D | — | — | — | 6.77 D |
| H-5" | 7.23 M | 6.91 T | 8.06 D | 7.90 D | 8.12 D | — | 6.91 T | 6.90 T |
| H-6" | 7.29 M | 7.29 M | 7.55 M | 7.48 D | 7.54 Td | — | 7.29 M | 7.28 M |
| H-7" | — | — | 7.46 T | 7.44 M | 7.45 Td | — | — | — |
| H-8" | — | — | 8.23 D | 8.18 D | 8.23 D | — | — | — |
| H-1' | 4.15 T | 4.12 M | 4.06 T | 4.09 T | 4.06 T | 4.15 M | 4.15 T | 4.16 T |
| H-2' | 1.88 M | 1.85 M | 1.79 M | 1.86 M | 1.80 M | 1.87 M | | 1.60-1.79 |
| H-3' | 1.32 M | 1.31 M | 1.24 M | 1.39 M | 1.26 M | | | 1.60-1.79 |
| H-4' | 1.32 M | 1.31 M | 1.28 M | 1.64 M | 1.28 M | 1.34 M | | 1.60-1.79 |
| H-5' | 0.89 T | 0.88 T | 0.84 T | 4.36 Dt | 0.84 T | 0.88 M | | 1.13-1.30 |
| H-6' | — | — | — | — | — | — | | 0.90-1.04 |
| H-7' | — | — | — | — | — | — | | 1.13-1.30 |
| H-8' | — | — | — | — | — | — | | 1.60-1.79 |
| H-2C | — | — | — | — | — | — | — | — |
| H-1"N | — | — | — | — | — | — | — | — |
| H-2"C(a/b) | — | — | — | — | — | 1.33/1.29 | — | — |
| H-3"C(a/b) | — | — | — | — | — | 1.33/1.29 | — | — |
| H-2"O | — | 3.81 S | — | — | — | — | 3.82 S | — |
| H-3"O | — | — | — | — | — | — | — | 3.77 S |
| H-4"a | — | — | — | — | — | — | — | — |
| H-4"b | — | — | — | — | — | — | — | — |
| H-4"O | — | — | — | — | — | — | — | — |
| H-4"C | — | — | 2.77 S | — | — | — | — | — |
| H-4"Ca | — | — | — | — | 3.17 M | — | — | — |
| H-4"Cb | — | — | — | — | 1.43 T | — | — | — |
| H-5"N | — | — | — | — | — | — | — | — |
| H-3'N | — | — | — | — | — | — | — | — |
| H-6'N | — | — | — | — | — | — | — | — |
| H-4'O | — | — | — | — | — | — | — | — |
| H-5'O | — | — | — | — | — | — | — | — |
| 2* | 4.31 S | 4.16 S | — | — | — | — | 4.16 S | 4.11 S |
| MeOH | — | — | — | — | — | — | — | 3.48 |
| Acetone | — | — | — | — | — | — | — | — |

TABLE 1-continued

| Label Actual | RCS-08 (4-methoxy) | JWH-019 Cayman | JWH-022 Cayman | AM-1220 Cayman | RCS-4 (C4 homolog) Cayman | RCS-4 (2-methoxy) Cayman | RCS-4 (3-methoxy) Cayman |
|---|---|---|---|---|---|---|---|
| H-2 | 7.75 S | 7.32-7.41 | 7.32-7.41 | 7.32-7.56 | 7.57 S | 7.39-7.43 | |
| H-4 | 8.39 M | 8.48 M | 8.50 M | 8.46 M | 8.35 M | 8.28 M | 8.29 M |
| H-5 | 7.20-7.34 | 7.33 M | 7.35 M | 7.35 M | 7.29 M | 7.27 M | 7.25 M |
| H-6 | 7.20-7.34 | 7.39 M | 7.32-7.41 | 7.42 M | 7.31 M | 7.30-7.35 | |
| H-7 | 7.20-7.34 | 7.32-7.41 | 7.32-7.41 | 7.52 M | 7.39 M | 7.30-7.35 | |
| H-1" | — | — | — | — | — | — | — |
| H-2" | 7.20-7.34 | 7.64 D | 7.65 D | 7.66 D | 7.83 Dt | — | 7.53 S |
| H-3" | 6.85 D | 7.50 M | 7.51 M | 7.52 M | 6.98 Dt | 6.98 T | — |
| H-4" | — | 7.96 D | 7.96 D | 7.97 D | — | 7.38 M | |
| H-5" | 6.85 D | 7.90 D | 7.90 D | 7.91 D | 6.98 Dt | 7.26 M | |
| H-6" | 7.20-7.34 | 7.49 M | 7.49 M | 7.51 M | 7.83 Dt | 6.95 T | |
| H-7" | — | 7.44 M | 7.46 M | 7.47 M | — | — | — |
| H-8" | — | 8.17 D | 8.17 D | 8.19 D | — | — | — |
| H-1' | 4.15 T | 4.06 T | 4.08 T | 4.53 and 3.84 | 4.16 T | 4.05 T | 4.08 T |
| H-2' | 1.60-1.81 | 1.79 M | 1.91 M | 2.37 M | 1.85 M | 1.79 M | 1.79 M |
| H-3' | 1.60-1.81 | 1.23 M | 2.03 M | — | 1.35 M | 1.26 M | 1.25 M |
| H-4' | 1.60-1.81 | 1.28 M | 5.71 M | 2.11 and 2.85 | 0.94 T | 1.26 M | 1.24 M |
| H-5' | 1.12-1.34 | 1.22 M | 4.96 M | 1.61 and 1.58 | — | 0.82 T | 0.80 T |
| H-6' | 0.80-1.04 | 0.82 T | — | 1.08 and 1.25 | — | — | — |
| H-7' | 1.12-1.34 | — | — | 1.08 and 1.50 | — | — | — |
| H-8' | 1.60-1.81 | — | — | — | — | — | — |
| H-2C | — | — | — | — | — | — | — |
| H-1"N | — | — | — | — | — | — | — |
| H-2"C(a/b) | — | — | — | — | — | — | — |
| H-3"C(a/b) | — | — | — | — | — | — | — |
| H-2"O | — | — | — | — | — | 3.74 S | — |
| H-3"O | — | — | — | — | — | — | 3.79 S |
| H-4"a | — | — | — | — | — | — | — |
| H-4"b | — | — | — | — | — | — | — |
| H-4"O | 3.77 S | — | — | — | 3.88 S | — | — |
| H-4"C | — | — | — | — | — | — | — |
| H-4"Ca | — | — | — | — | — | — | — |
| H-4"Cb | — | — | — | — | — | — | — |
| H-5"N | — | — | — | — | — | — | — |
| H-3'N | — | — | — | 2.41 S | — | — | — |
| H-6'N | — | — | — | — | — | — | — |
| H-4'O | — | — | — | — | — | — | — |
| H-5'O | — | — | — | — | — | — | — |
| 2* | 4.08 S | — | — | — | — | — | — |
| MeOH | — | — | — | 3.48 | — | — | — |
| Acetone | — | — | — | — | — | — | — |

| Label Actual | AM-679 Cayman | AB-Fubinaca Cayman | A-834735 Cayman | XLR-11 Cayman | AB-Pinaca Cayman | JWH-007 Cayman | AKB-48 (A-Pinaca) Cayman |
|---|---|---|---|---|---|---|---|
| H-2 | 7.29 S | — | 7.61 S | 7.66 S | — | — | — |
| H-4 | 8.32 M | 8.33 D | 8.39 M | 8.39 M | 8.31 M | 8.09 D | 8.37 D |
| H-5 | 7.33 M | 7.27 M | 7.25 M | 7.26 M | 7.27 M | 7.42 T | 7.23 M |
| H-6 | 7.38 M | 7.27-7.40 | 7.31 M | 7.32 M | 7.41 M | 7.49 T | 7.38 M |
| H-7 | 7.40 M | 7.27-7.40 | 7.34 M | 7.34 M | 7.44 M | 7.55 D | 7.38 D |
| H-1" | — | — | 1.93 S | 1.93 S | — | — | — |
| H-2" | — | 4.50 M | — | — | 4.49 M | 7.96 D | 2.20 M |
| H-3" | 7.92 Dd | 2.36 M | — | — | 2.38 M | 7.49 T | 2.13 M |
| H-4" | 7.15 Td | — | — | — | — | 7.90 D | 1.72 M |
| H-5" | 7.42 M | — | — | — | — | 6.98 M | — |
| H-6" | 7.37 M | — | — | — | — | 7.13 M | — |
| H-7" | — | — | — | — | — | 7.16 M | — |
| H-8" | — | — | — | — | — | 7.30 D | — |
| H-1' | 4.10 T | 5.58 S | 4.03 D | 4.17 T | 4.38 T | 4.11 T | 4.34 T |
| H-2' | 1.84 M | — | 2.14 M | 1.95 M | 1.94 M | 1.78 M | 1.92 M |
| H-3' | 1.30 M | 6.98 M | 1.41 and 1.43 | 1.50 M | 1.32 M | 1.36 M | 1.30 M |
| H-4' | 1.31 M | 7.18 Td | — | 1.73 M | 1.36 M | 1.36 M | 1.35 M |
| H-5' | 0.87 T | — | — | 4.43 Dt | 0.88 T | 0.90 T | 0.88 T |
| H-6' | — | 7.18 Td | 1.41 and 1.43 | — | — | — | — |
| H-7' | — | 6.98 M | — | — | — | — | — |
| H-8' | — | — | — | — | — | — | — |
| H-2C | — | — | — | — | — | 2.48 S | — |
| H-1"N | — | 7.48 D | — | — | 7.46 M | — | — |
| H-2"C(a/b) | — | — | 1.30 and 1.33 | 1.29 and 1.34 | — | — | — |
| H-3"C(a/b) | — | — | 1.30 and 1.33 | 1.29 and 1.34 | — | — | — |
| H-2"O | — | — | — | — | — | — | — |
| H-3"O | — | — | — | — | — | — | — |
| H-4"a | — | 1.07 D | — | — | 1.07 Dd | — | — |
| H-4"b | — | 1.07 D | — | — | 1.07 Dd | — | — |
| H-4"O | — | — | — | — | — | — | — |

TABLE 1-continued

| | | | | | | | |
|---|---|---|---|---|---|---|---|
| H-4"C | — | — | — | — | — | — | — |
| H-4"Ca | — | — | — | — | — | — | — |
| H-4"Cb | — | — | — | — | — | — | — |
| H-5"N | — | 5.74 D | — | — | 5.77 D | — | — |
| H-3'N | — | — | — | — | — | — | — |
| H-6'N | — | — | — | — | — | — | — |
| H-4'O | — | — | 3.32 and 3.96 | — | — | — | — |
| H-5'O | — | — | 3.32 and 3.96 | — | — | — | — |
| 2* | — | — | — | — | — | — | — |
| MeOH | — | — | — | — | — | — | — |
| Acetone | — | — | — | — | — | — | — |

CDCl Proton HERBS (Avg. Method)

| Label Name | Moon Spice | | Nuclear Bomb | Ion Source | | K-250 | Extremely Legal XXX | |
|---|---|---|---|---|---|---|---|---|
| Possible ID | RCS-04 | JWH-018 | JWH-122 | JWH-203 | RCS-080 | JWH-250 | JWH-122 | JWH-210 |
| H-2 | 7.36 M | 7.36 M | 7.34 M | 7.31 M | 7.31 M | 7.27 M | 7.36 M | 7.36 M |
| H-4 | 8.36 M | 8.47 M | 8.43 M | 8.39 M | 8.39 M | 8.39 M | 8.47 M | 8.47 M |
| H-5 | 7.25-7.38 | 7.33-7.38 | 7.32-7.35 | 7.23-7.39 | 7.23-7.39 | 7.20-7.33 | 7.33-7.40 | 7.33-7.40 |
| H-6 | 7.25-7.38 | 7.33-7.38 | 7.32-7.35 | 7.23-7.39 | 7.23-7.39 | 7.20-7.33 | 7.33-7.40 | 7.33-7.40 |
| H-7 | 7.25-7.38 | 7.33-7.38 | 7.32-7.35 | 7.23-7.39 | 7.23-7.39 | 7.20-7.33 | 7.33-7.40 | 7.33-7.40 |
| H-1" | — | — | — | — | — | — | — | — |
| H-2" | 7.84 D | 7.64 M | N/D | — | 6.89 M | — | 7.56 M | 7.56 M |
| H-3" | 6.98 D | 7.52 M | 7.53 M | 7.31 M | — | 6.89 M | 7.53 M | 7.56 M |
| H-4" | — | 7.96 D | 8.04 M | 7.31 M | 6.89 M | 7.27 M | 8.06 D | 8.12 D |
| H-5" | 6.98 D | 7.90 D | N/D | 7.87 D | 7.51 M | 7.85 M | 8.06 D | 8.12 D |
| H-6" | 7.84 D | 7.48 M | 7.46 M | 7.31 M | 7.31 M | — | 7.47 M | 7.47 M |
| H-7" | — | 7.48 M | 7.46 M | — | — | — | 7.47 M | 7.47 M |
| H-8" | — | 8.17 D | 8.19 M | — | — | — | 8.23 D | 8.23 D |
| H-1' | 4.15 T | 4.05 T | 4.04 M | 4.13 M | 4.13 M | 4.13 M | 4.05 T | 4.05 T |

| Label Name | Sweet Leaf | | | Melon Code Black | | Head Trip | Rack City |
|---|---|---|---|---|---|---|---|
| Possible ID | JWH-210 | JWH-122 | JWH-250 | JWH-122 | JWH-203 | JWH-210 | XLR-11 |
| H-2 | 7.33 M | 7.33 M | 7.87 S | 7.35 M | 7.35 M | 7.34 M | 7.65 S |
| H-4 | 8.48 M | 8.48 M | 8.40 M | 8.46 M | 8.39 M | 8.46 M | 8.39 M |
| H-5 | 7.35 M | 7.35 M | 7.26 M | 7.31-7.39 | 7.19-7.30 | 7.29-7.39 | 7.26 M |
| H-6 | 7.24-7.38 | 7.24-7.38 | 7.24-7.38 | 7.31-7.39 | 7.19-7.30 | 7.29-7.39 | 7.32 M |
| H-7 | 7.24-7.38 | 7.24-7.38 | 7.24-7.38 | 7.31-7.39 | 7.19-7.30 | 7.29-7.39 | 7.34 M |
| H-1" | | | | | | | 1.93 S |
| H-2" | 7.58 D | 7.55 M | — | 7.55 M | — | 7.54 M | — |
| H-3" | 7.38 M | 7.37 M | 6.87 D | 7.55 M | 7.25 M | 7.54 M | — |
| H-4" | — | — | 7.33 M | — | 7.25 M | 8.12 D (small) | — |
| H-5" | 8.12 D | 8.06 D | 6.91 T | 8.05 M | 7.86 D | 8.12 D (small) | — |
| H-6" | 7.51 M | 7.51 M | — | 7.46 M | 7.35 M | 7.46 T | — |
| H-7" | 7.51 M | 7.51 M | — | 7.46 M | — | 7.46 T | — |
| H-8" | 8.23 M | 8.23 M | — | 8.23 M | — | 8.22 D | — |
| H-1' | 4.06 T | 4.06 T | 4.12 M | 4.06 T | 4.15 T | 4.05 T | 4.17 T |

| Label Name | Zombie Matter | | Mr. Nice Guy | | Cloud Nine | |
|---|---|---|---|---|---|---|
| Possible ID | AM-2201 | JWH-210 | AM-2201 | JWH-122 | XLR-11 | UR-144 |
| H-2 | 7.31-7.40 M | 7.31-7.40 M | 7.35 M | 7.35 M | 7.65 S | 7.65 S |
| H-4 | 8.48 M | 8.48 M | 8.48 M | 8.48 M | 8.39 M | 8.39 M |
| H-5 | 7.32-7.40 | 7.32-7.40 | 7.34-7.37 | 7.34-7.37 | 7.26 M | 7.26 M |
| H-6 | 7.32-7.40 | 7.32-7.40 | 7.34-7.37 | 7.34-7.37 | 7.33 M | 7.33 M |
| H-7 | 7.32-7.40 | 7.32-7.40 | 7.34-7.37 | 7.34-7.37 | 7.30-7.35 | 7.30-7.35 |
| H-1" | — | — | — | — | 1.93 S | 1.93 S |
| H-2" | 7.65 D | 7.58 D | 7.42-7.58 | 7.65 D | — | — |
| H-3" | 7.42-7.56 | 7.32-7.40 | 7.51 M | 7.56 M | — | — |
| H-4" | 7.96 D | — | 7.97 D | — | — | — |
| H-5" | 7.90 D | 8.12 D | 7.90 D | 8.06 D | — | — |
| H-6" | 7.42-7.56 | 7.42-7.56 | 7.49 M | 7.52 M | — | — |
| H-7" | 7.42-7.56 | 7.42-7.56 | 7.45 M | 7.45 M | — | — |
| H-8" | 8.17 D | 8.23 D | 8.18 D | 8.23 D | — | — |
| H-1' | 4.09-4.03 | 4.09-4.03 | 4.09 M | 4.07 M | 4.17 M | 4.14 M |

TABLE 2

COSY Correlations - Short Range Proton-Proton Interactions

STANDARDS (CDCl$_3$)

| Label Actual | JWH-22 as labeled Cayman | JWH-203 as labeled M.I. | AM-1220 as labeled Cayman | RCS-4 C4 homolog as labeled Cayman | AM-2201 as labeled Cayman | JWH-122 as labeled Cayman | "AM-1221" AM-2201 (Impurities) |
|---|---|---|---|---|---|---|---|
| H-4/H-5 | 8.48/7.35 | 8.39/7.28 | 8.46/7.35 | 8.35/7.29 | 8.47/7.34 | 8.47/7.34 | 8.48/7.35 |
| H-5/H-6 | N/D | 7.28/7.33 | 7.35/7.42 | 7.29/7.31 | 7.33/7.38 | 7.35/7.37 | 7.34/7.36 |
| H-6/H-7 | N/D | 7.33/7.36 | N/D | 7.30/7.39 | 7.37/7.40 | 7.36/7.40 | 7.37/7.40 |
| H-2"/H-3" | 7.64/7.51 | — | 7.66/7.51 | 7.83/6.98 | 7.63/7.50 | 7.55/7.36 | 7.64/7.52 |
| H-3"/H-4" | 7.51/7.95 | 7.38/7.20 | 7.52/7.97 | — | 7.51/7.95 | — | 7.51/7.96 |
| H-4"/H-5" | — | 7.19/7.23 | — | — | — | — | — |
| H-5"/H-6" | 7.89/7.49 | 7.24/7.28 | 7.90/7.51 | 6.98/7.83 | 7.89/7.48 | 8.06/7.54 | 7.90/7.50 |
| H-6"/H-7" | N/D | — | 7.52/7.45 | — | 7.49/7.45 | 7.55/7.46 | 7.49/7.45 |
| H-7"/H-8" | 7.46/8.16 | — | 7.47/8.19 | — | 7.44/8.16 | 7.46/8.23 | 7.45/8.17 |
| H-1'/H-2' | 4.06/1.91 | 4.14/1.88 | N/D | 4.16/1.85 | 4.07/1.84 | 4.05/1.79 | 4.07/1.84 |
| H-2'/H-3' | 1.90/2.02 | 1.87/1.33 | — | 1.84/1.36 | 1.84/1.39 | 1.79/1.24 | 1.84/1.38 |
| H-3'/H-4' | 2.01/4.96 | 1.34/1.29 | — | 1.35/0.94 | 1.39/1.64 | 1.23/1.27 | 1.38/1.63 |
| H-4'/H-5' | 4.95/5.71 | 1.33/0.88 | N/D | — | 1.64/4.36 | 1.28/0.84 | 1.64/4.36 |
| H-5'/H-6' | — | — | 1.61/1.08 | — | — | — | — |
| H-6'/H-7' | — | — | 1.09/1.25 | — | — | — | — |
| H-4"Ca/H-4"Cb | — | — | — | — | — | — | — |
| H-1'a/H-1'b | — | — | 4.53/3.84 | — | — | — | — |
| H-4'a/H-4'b | — | — | 2.85/2.11 | — | — | — | — |
| H-3'N/H-4'O | — | — | — | — | — | — | — |
| H-5'O/H-6'N | — | — | — | — | — | — | — |
| H-1"N/H-2" | — | — | — | — | — | — | — |
| H-3"/H-4"a/b | — | — | — | — | — | — | — |

| Label Actual | JWH-081 as labeled M.I. | "JWH-122" JWH-200 M.I. | JWH-250 as labeled M.I. | JWH-210 Cayman | UR-144 Cayman |
|---|---|---|---|---|---|
| H-4/H-5 | 8.46/7.34 | 8.52/7.36 | 8.39/7.26 | 8.49/7.34 | 8.39/7.27 |
| H-5/H-6 | N/D | 7.36/7.44 | 7.25/7.32 | 7.34/7.40 | 7.25/7.33 |
| H-6/H-7 | N/D | N/D | N/D | N/D | 7.32/7.38 |
| H-2"/H-3" | 7.64/6.82 | 7.64/7.51 | — | 7.58/7.38 | — |
| H-3"/H-4" | — | 7.52/7.96 | 6.87/7.21 | — | — |
| H-4"/H-5" | — | — | 7.22/6.92 | — | — |
| H-5"/H-6" | 8.29/7.50 | 7.90/7.50 | 6.90/7.28 | 8.12/7.53 | — |
| H-6"/H-7" | 7.52/7.48 | N/D | — | 7.54/7.46 | — |
| H-7"/H-8" | 7.50/8.30 | 7.46/8.16 | — | 7.46/8.24 | — |
| H-1'/H-2' | 4.06/1.81 | 4.14/2.69 | 4.11/1.85 | 4.05/1.80 | 4.15/1.87 |
| H-2'/H-3' | 1.81/1.26 | — | 1.85/1.28 | 1.80/1.26 | 1.89/1.34 |
| H-3'/H-4' | 1.26/1.28 | — | 1.27/1.32 | 1.24/1.28 | N/D |
| H-4'/H-5' | 1.30/0.84 | — | 1.32/0.87 | 1.28/0.84 | 1.34/0.90 |
| H-5'/H-6' | — | — | — | — | — |
| H-6'/H-7' | — | — | — | — | — |
| H-4"Ca/H-4"Cb | — | — | — | 3.18/1.43 | — |
| H-1'a/H-1'b | — | — | — | — | — |
| H-4'a/H-4'b | — | — | — | — | — |
| H-3'N/H-4'O | — | 2.38/3.54 | — | — | — |
| H-5'O/H-6'N | — | 3.54/2.38 | — | — | — |
| H-1"N/H-2" | — | — | — | — | — |
| H-3"/H-4"a/b | — | — | — | — | — |

| Label Actual | JWH-019 Cayman | RCS-4 (2-methoxy) Cayman | RCS-4 (3-methoxy) Cayman | AM-679 Cayman | AB-Fubinaca Cayman |
|---|---|---|---|---|---|
| H-4/H-5 | 8.46/7.33 | 8.28/7.27 | 8.29/7.25 | 8.32/7.33 | 8.33/7.27 |
| H-5/H-6 | 7.33/7.39 | N/D | N/D | 7.32/7.38 | N/D |
| H-6/H-7 | N/D | N/D | N/D | 7.37/7.40 | N/D |
| H-2"/H-3" | 7.63/7.50 | — | — | — | 4.50/2.36 |
| H-3"/H-4" | 7.50/7.95 | 6.97/7.40 | — | 7.92/7.15 | — |
| H-4"/H-5" | 7.95/7.90 | N/D | 7.02/7.28 | 7.15/7.42 | — |
| H-5"/H-6" | 7.89/7.49 | 7.35/6.95 | N/D | 7.40/7.37 | — |
| H-6"/H-7" | 7.49/7.44 | — | — | — | — |
| H-7"/H-8" | 7.44/8.16 | — | — | — | — |
| H-1'/H-2' | 4.06/1.80 | 4.05/1.79 | 4.08/1.78 | 4.10/1.84 | — |
| H-2'/H-3' | 1.79/1.24 | 1.79/1.26 | 1.79/1.26 | 1.84/1.30 | — |
| H-3'/H-4' | N/D | N/D | N/D | 1.36/1.29 | 6.98/7.18 |
| H-4'/H-5' | 1.28/1.21 | 1.26/0.82 | 1.24/0.80 | 1.31/0.87 | — |
| H-5'/H-6' | 1.23/0.81 | — | — | — | — |
| H-6'/H-7' | — | — | — | — | 7.18/6.98 |
| H-4"Ca/H-4"Cb | — | — | — | — | — |
| H-1'a/H-1'b | — | — | — | — | — |
| H-4'a/H-4'b | — | — | — | — | — |

TABLE 2-continued

| COSY Correlations - Short Range Proton-Proton Interactions | | | | | |
|---|---|---|---|---|---|
| H-3'N/H-4'O | — | — | — | — | — |
| H-5'O/H-6'N | — | — | — | — | — |
| H-1"N/H-2" | — | — | — | — | 7.48/4.50 |
| H-3"/H-4"a/b | — | — | — | — | 2.36/1.07 |

| Label | XLR-11 | AB-Pinaca | AKB-48 | AKB-48-5Fluoro | JWH-007 |
|---|---|---|---|---|---|
| Actual | Cayman | Cayman | Cayman | Cayman | Cayman |
| H-4/H-5 | 8.39/7.26 | 8.31/7.27 | 8.37/7.23 | 8.37/7.23 | 8.10/7.42 |
| H-5/H-6 | 7.26/7.32 | 7.27/7.41 | 7.22/7.37 | 7.24/7.38 | 7.42/7.49 |
| H-6/H-7 | 7.32/7.34 | 7.42/7.44 | 7.38/7.36 | N/D | 7.49/7.55 |
| H-2"/H-3" | — | 4.49/2.38 | — | — | 7.96/7.49 |
| H-3"/H-4" | — | — | 2.18/2.14 | 2.20/2.12 | 7.49/7.90 |
| H-4"/H-5" | — | — | 2.12/1.73 | 2.13/1.73 | — |
| H-5"/H-6" | — | — | — | — | 6.98/7.13 |
| H-6"/H-7" | — | — | — | — | 7.12/7.17 |
| H-7"/H-8" | — | — | — | — | 7.16/7.30 |
| H-1'/H-2' | 4.17/1.95 | 4.37/1.94 | 4.34/1.91 | 4.37/1.98 | 4.11/1.78 |
| H-2'/H-3' | 1.94/1.50 | 1.94/1.32 | 1.91/1.30 | 1.98/1.45 | 1.78/1.36 |
| H-3'/H-4' | 1.49/1.73 | N/D | 1.30/1.35 | 1.42/1.73 | N/D |
| H-4'/H-5' | 1.72/4.43 | 1.36/0.89 | 1.35/0.88 | 1.73/4.42 | 1.36/0.90 |
| H-5'/H-6' | — | — | — | — | — |
| H-6'/H-7' | — | — | — | — | — |
| H-4"Ca/H-4"Cb | — | — | — | — | — |
| H-1'a/H-1'b | — | — | — | — | — |
| H-4'a/H-4'b | — | — | — | — | — |
| H-3'N/H-4'O | — | — | — | — | — |
| H-5'O/H-6'N | — | — | — | — | — |
| H-1"N/H-2" | — | 7.46/4.49 | — | — | — |
| H-3"/H-4"a/b | — | 2.38/1.06 | — | — | — |

| HERBS ($CDCl_3$) | | | | | | | | | | |
|---|---|---|---|---|---|---|---|---|---|---|
| Label Name | Mr. Nice Guy | Rack City | Sweet Leaf | | | Cloud Nine | | Melon Code Black | |
| Possible ID | JWH-122 | AM-2201 | XLR-11 | JWH-122 | JWH-250 | JWH-210 | XLR-11 | UR-144 | JWH-122 | JWH-203 |
| H-4/H-5 | 8.48/7.35 | 8.48/7.35 | 8.40/7.25 | 8.49/7.35 | 8.40/7.26 | 8.49/7.35 | 8.39/7.26 | 8.39/7.26 | 8.46/7.34 | 8.38/7.27 |
| H-5/H-6 | N/D | N/D | 7.26/7.32 | N/D | N/D | N/D | 7.26/7.33 | 7.26/7.33 | N/D | 7.28/7.35 |
| H-6/H-7 | N/D | N/D | 7.32/7.34 | N/D | N/D | N/D | N/D | N/D | N/D | N/D |
| H-2"/H-3" | 7.55/7.36 | 7.64/7.51 | — | 7.55/7.37 | — | 7.58/7.38 | — | — | 7.54/7.36 | — |
| H-3"/H-4" | — | 7.52/7.96 | — | — | N/D | — | — | — | — | 7.38/7.20 |
| H-4"/H-5" | — | — | — | — | N/D | — | — | — | — | N/D |
| H-5"/H-6" | 8.06/7.54 | — | — | 8.07/7.55 | N/D | 8.12/7.54 | — | — | 8.05/7.53 | N/D |
| H-6"/H-7" | N/D | N/D | — | 7.54/7.46 | — | 7.54/7.46 | — | — | 7.54/7.46 | — |
| H-7"/H-8" | 7.46/8.23 | 7.46/8.17 | — | 7.47/8.24 | — | 7.47/8.24 | — | — | 7.46/8.22 | — |
| H-1'/H-2' | 4.06/1.80 | 4.09/1.85 | 4.17/1.94 | 4.07/1.80 | 4.12/1.86 | 4.07/1.80 | 4.17/1.94 | 4.14/1.88 | 4.05/1.78 | 4.14/1.87 |
| H-2'/H-3' | 1.79/1.25 | 1.85/1.39 | 1.94/1.50 | N/D | N/D | 1.80/1.26 | 1.94/1.48 | 1.88/1.34 | 1.78/1.24 | 1.87/1.32 |
| H-3'/H-4' | N/D | 1.40/1.65 | 1.49/1.72 | N/D | N/D | N/D | 1.49/1.72 | N/D | N/D | N/D |
| H-4'/H-5' | 1.26/0.84 | 1.64/4.37 | 1.73/4.43 | 1.28/0.85 | N/D | 1.28/0.85 | 1.73/4.43 | 1.34/0.89 | 1.26/0.83 | 1.33/0.88 |
| H-4"Ca/H-4"Cb | — | — | — | — | 3.19/1.44 | — | — | — | — | — |

H-4 is the hydrogen responsible for the first signature peak/spot, and H-1' is the hydrogen responsible for the second signature peak/spot. Any other hydrogen within the herein identified range may be used as the third signature peak/spot.

S is singlet, D is doublet, T is triplet, Q is quartet, M is multiplet, Dd is doublet of doublets, Dt is doublet of triplets, Td is triplet of doublets, and Br is broad signal. N/D is not detected.

We claim:

1. A method for detecting one or more synthetic indole or indazole cannabinoids selected from a group of formulas consisting of:

JWH-018

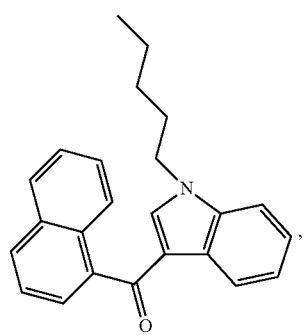

JWH-081

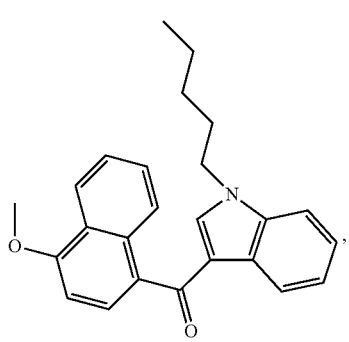

JWH-203

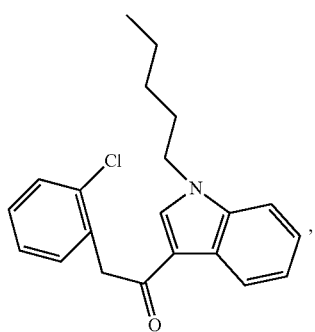

RCS-08

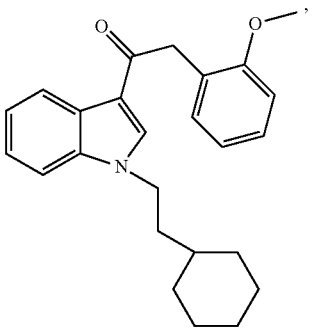

AM-2201

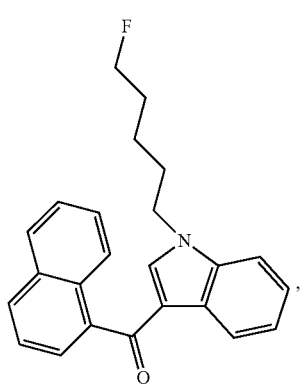

JWH-250

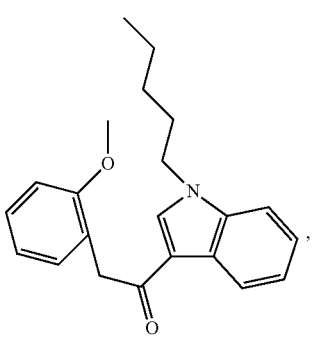

JWH-122

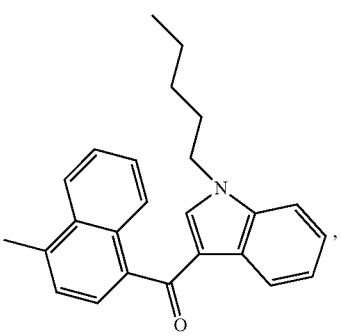

RCS-4
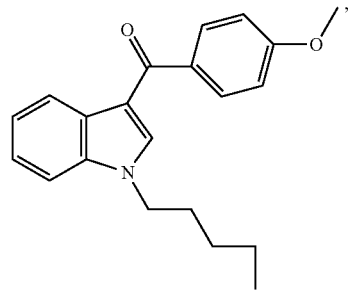
JWH-412
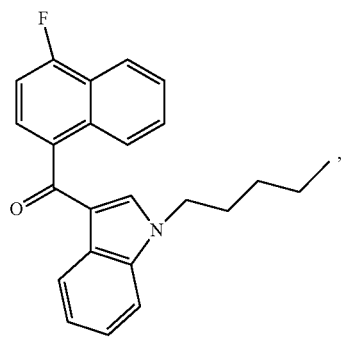
JWH-020
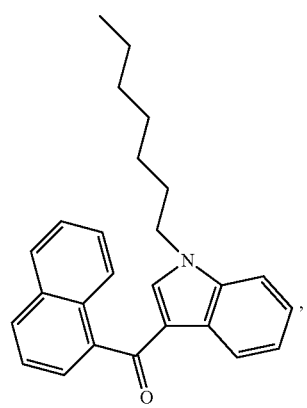
JWH-210
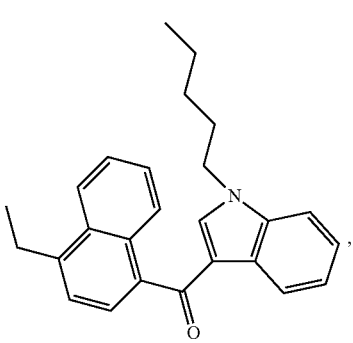
JWH-019
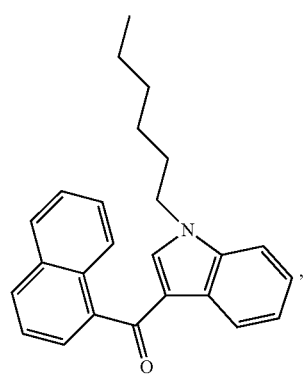
MAM-2201
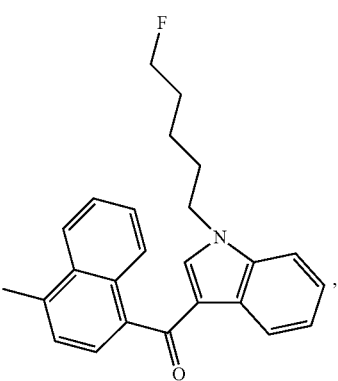
JWH-200
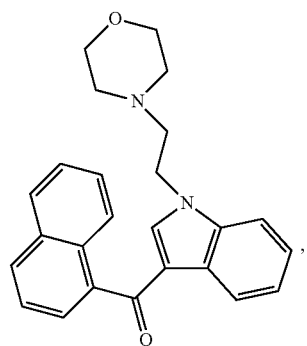
UR-144
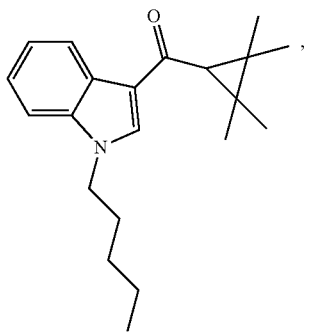

XLR-11

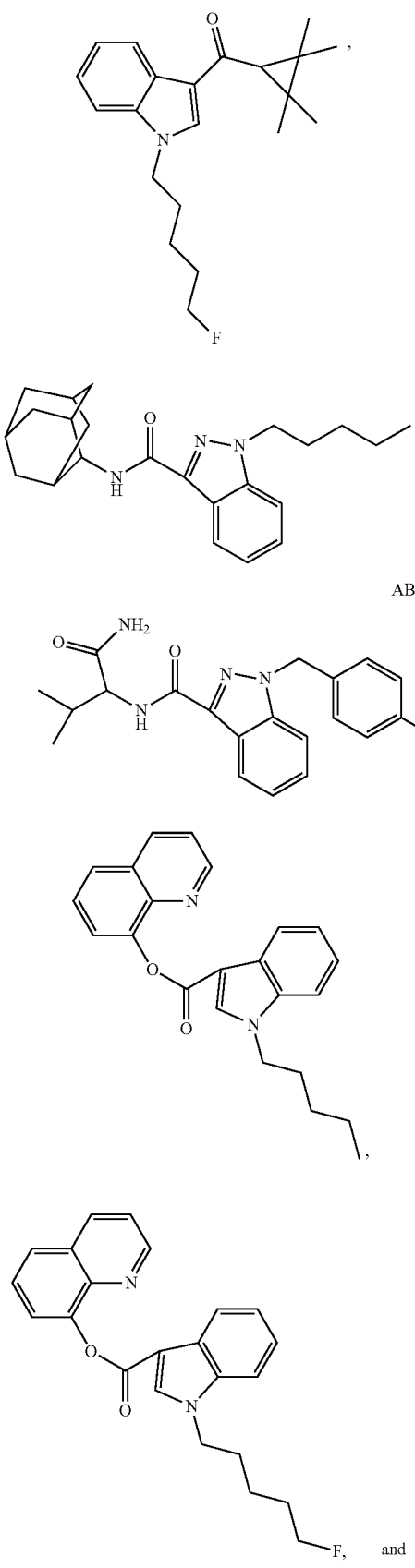

AKB-48

AB-FUBINACA

PB-22

5F-PB-22

ADB-PINACA

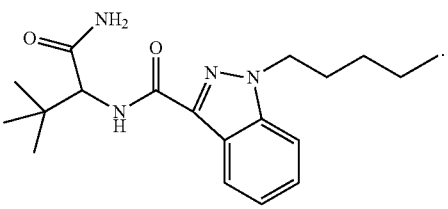

said method comprising:
providing a solid botanical sample suspected to contain synthetic indole or indazole cannabinoids;
adding a deuterated solvent to the solid botanical sample to create a suspension;
mixing the suspension to release synthetic indole or indazole cannabinoids from the solid botanical sample;
subjecting the suspension to a NMR spectroscopy process to produce a sample NMR spectrum;
detecting one or more of the synthetic indole or indazole cannabinoids characterized by the group of formulas in the suspension by analysis of the sample NMR spectrum;
wherein said NMR spectroscopy process comprises at least one of:
one-dimensional proton NMR, wherein said analysis comprises detection of a first peak between 8.00 and 8.50 ppm, and a second peak between 4.00 and 4.40 ppm, and
two-dimensional COSY NMR, wherein said analysis comprises detection of a first spot between 6.5 and 9 ppm, and a second spot between 1.50 and 4.50 ppm;
wherein said method is performed in the absence of chromatography; and
optionally, quantifying an amount or amounts of synthetic indole or indazole cannabinoids characterized by one or more of the formulas in the group.

2. The method of claim 1, wherein said NMR spectroscopy process is one-dimensional proton NMR, said method further comprising detection of a third peak of synthetic indole or indazole cannabinoids in one of the formulas in the group of formulas between 7.30 and 7.90.

3. The method of claim 1, wherein said NMR spectroscopy process is two-dimensional COSY NMR, said method further comprising detection of a third spot between 1.50 and 4.50 or between 6.50 and 9.00 ppm.

4. The method of claim 1, wherein said deuterated solvent is selected from the group consisting of: $D_2O$, $CD_3OD$, $(CD_3)_2SO$, $CDCl_3$, $(CD_3)_2CO$, $CD_3CN$, $C_2D_6O$, and $C_3D_7OD$.

5. The method of claim 1, wherein said deuterated solvent is selected from the group consisting of: $(CD_3)_2CO$ and $CDCl_3$.

6. The method of claim 1, wherein said one-dimensional proton NMR comprises a proton program run for a minimum of 32 scans.

7. The method of claim 1, wherein said two dimensional COSY NMR comprises a proton-proton correlation spectroscopy program run for one scan.

8. The method of claim 1, wherein said solid botanical sample suspected to contain synthetic indole or indazole cannabinoids comprises less than 0.5 mg of synthetic indole or indazole cannabinoids per mg of the solid sample.

9. The method of claim 1, wherein said solid botanical sample suspected to contain synthetic indole or indazole cannabinoids is from 10 to 100 mg in mass.
10. A method for detecting one or more synthetic indole or indazole cannabinoids selected from a group of formulas consisting of:
JWH-018
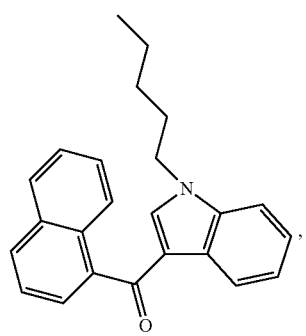
JWH-081
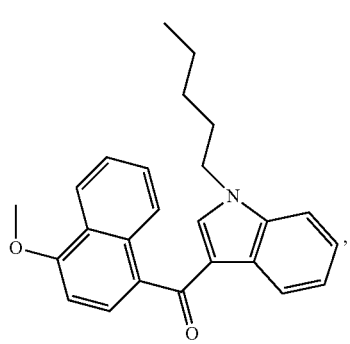
JWH-203
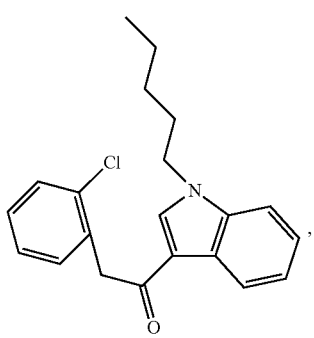
RCS-08
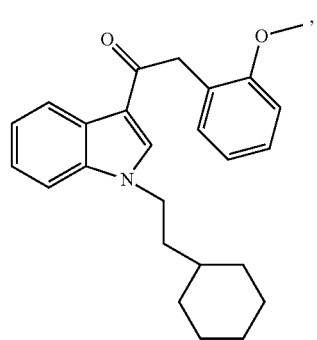
-continued
AM-2201
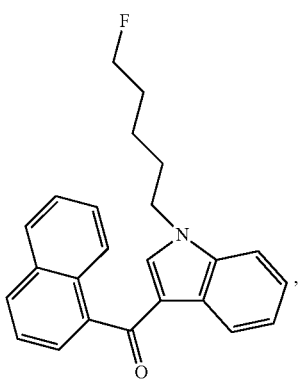
JWH-250
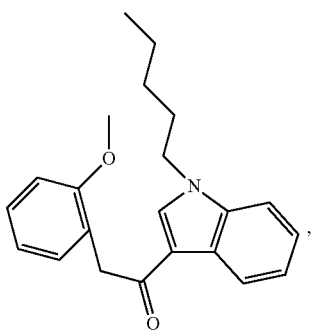
JWH-122
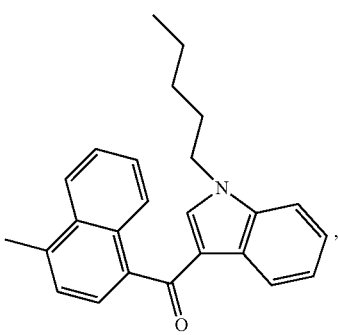
RCS-4

JWH-020
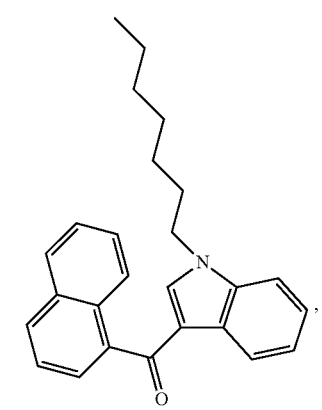
JWH-019
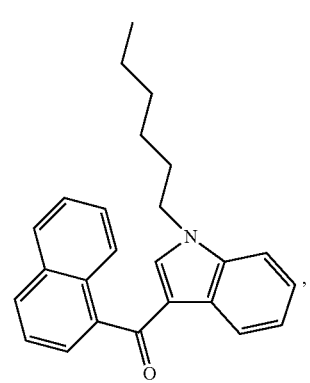
JWH-200
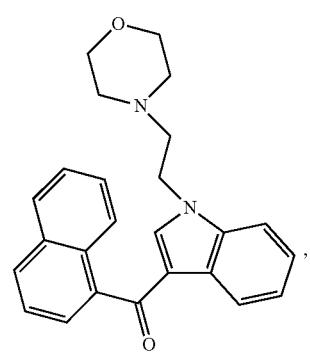
JWH-412
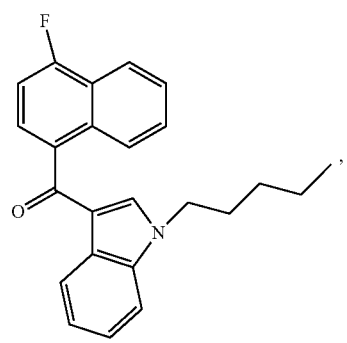
JWH-210
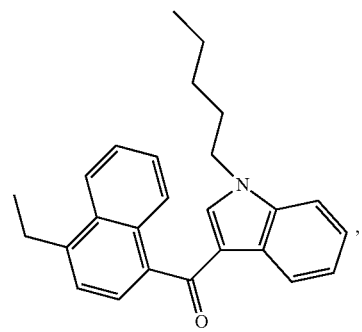
MAM-2201
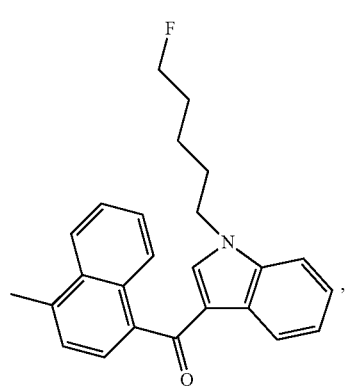
UR-144
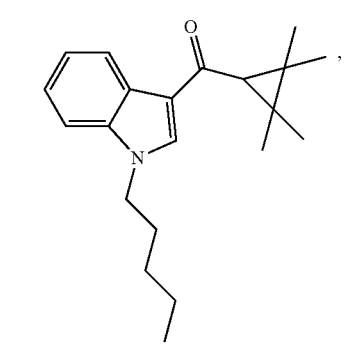
XLR-11
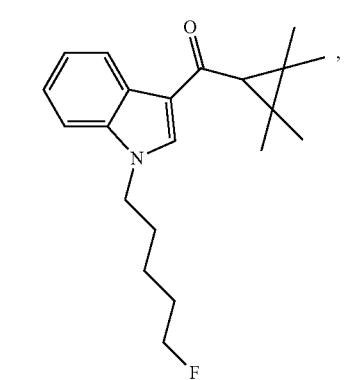
AKB-48
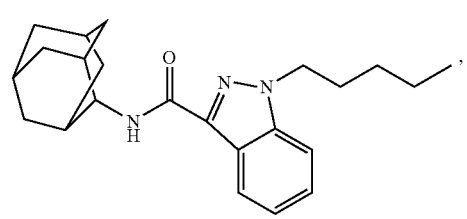

-continued

AB-FUBINACA

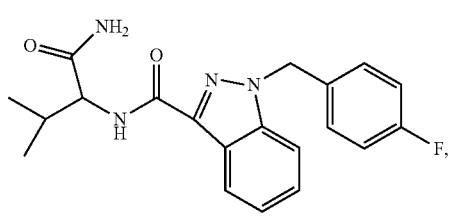

PB-22

5F-PB-22

ADB-PINACA said method comprising:
providing a solid botanical sample;
adding a deuterated solvent to the solid botanical sample to create a suspension;
subjecting the suspension to an NMR spectroscopy process to produce a sample NMR spectrum; and
detecting one or more of the synthetic indole or indazole cannabinoids characterized by the group of formulas in the suspension by analysis of the sample NMR spectrum;
wherein said NMR spectroscopy process is one-dimensional proton NMR, wherein said analysis comprises detection of a first peak between 8.00 and 8.50 ppm, a second peak between 4.00 and 4.40 ppm; and
wherein said method is performed in the absence of chromatography.

11. The method of claim 10, wherein said solid botanical sample is from 10 to 100 mg in mass.

12. A method for detecting one or more synthetic indole or indazole cannabinoids selected from a group of formulas consisting of:

JWH-018

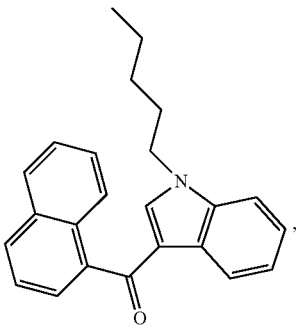

JWH-081

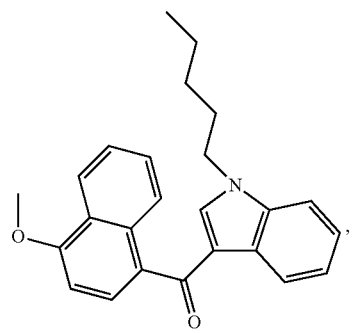

JWH-203

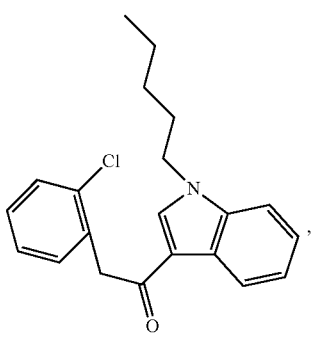

RCS-08

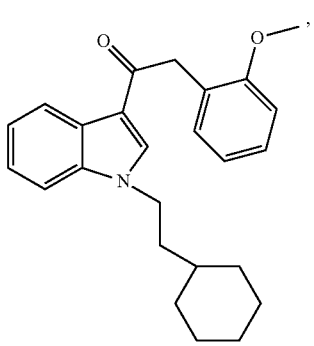

AM-2201
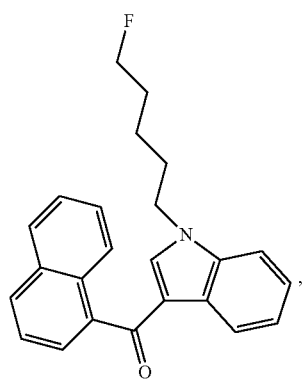
JWH-020
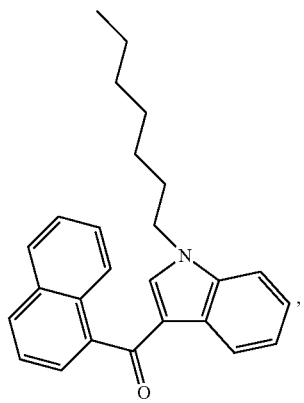
JWH-250
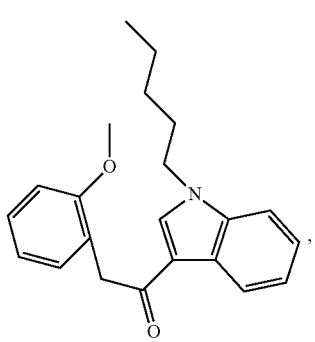
JWH-019
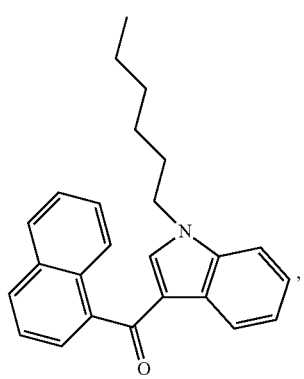
JWH-122
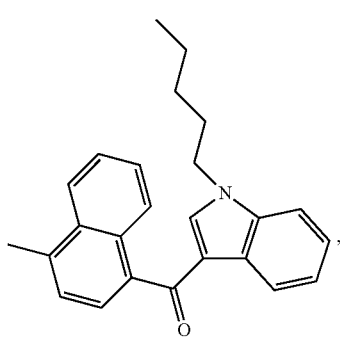
JWH-200
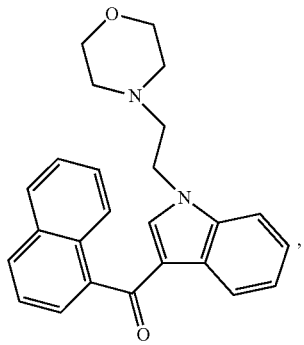
RCS-4
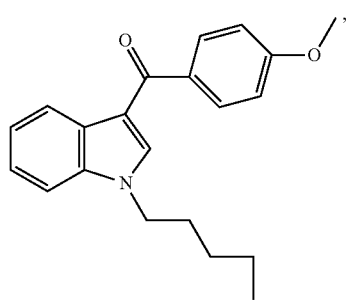
JWH-412
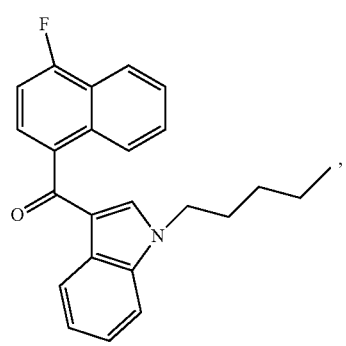

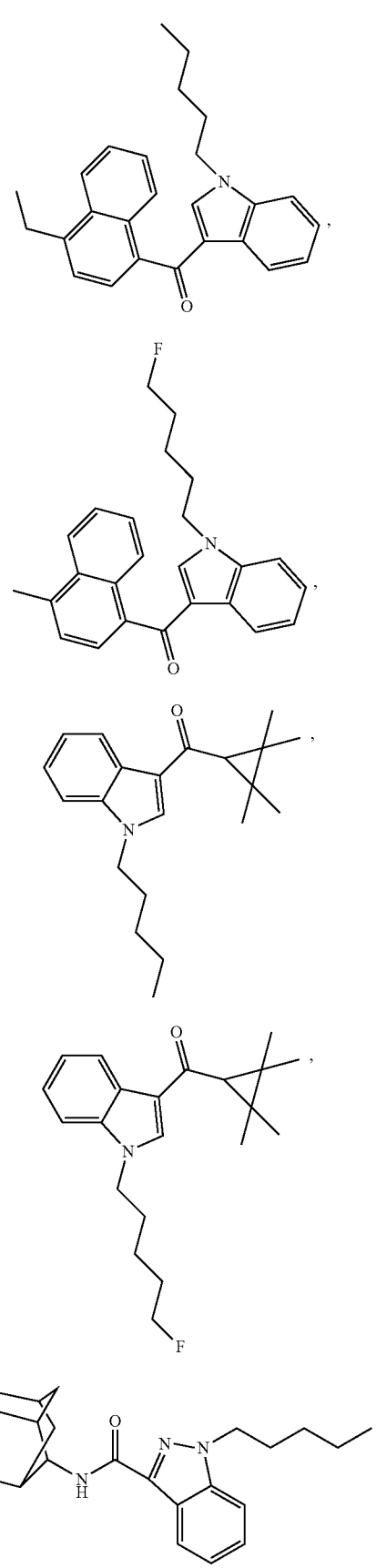

JWH-210, MAM-2201, UR-144, XLR-11, AKB-48

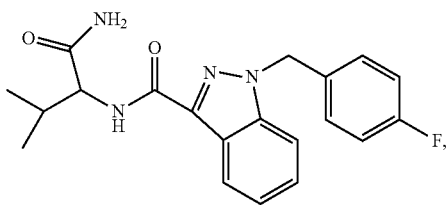

AB-FUBINACA

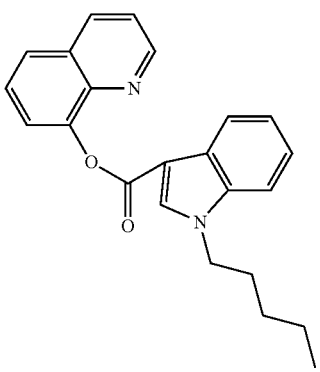

PB-22

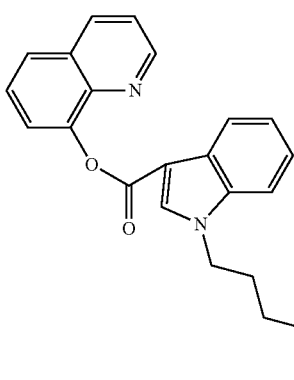

5F-PB-22 and

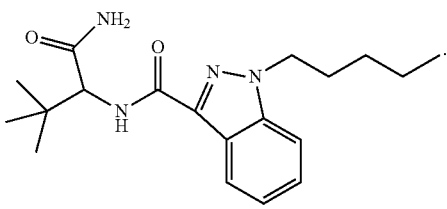

ADB-PINACA.

said method comprising:

subjecting a suspension comprising a solid botanical sample, suspected to contain one or more synthetic indole or indazole cannabinoids characterized by the group of formulas, and a solvent, to an NMR spectroscopy process to produce a sample NMR spectrum; and detecting one or more synthetic indole or indazole cannabinoids characterized by the group of formulas in the suspension by analysis of the sample NMR spectrum, wherein said NMR spectroscopy process is two-dimensional COSY NMR, wherein said analysis comprises detection of a first spot between 6.5 and 9 ppm, a second spot between 1.5 and 4.5 ppm; and wherein said method is performed in the absence of chromatography.

13. The method of claim 12, wherein said solid botanical sample is from 10 to 100 mg in mass.

\* \* \* \* \*